United States Patent
Koide et al.

(10) Patent No.: US 6,836,344 B2
(45) Date of Patent: *Dec. 28, 2004

(54) IMAGE RECORDING APPARATUS AND COPYING SYSTEM

(75) Inventors: Jun Koide, Yokohama (JP); Toshihiko Otsubo, Numazu (JP); Seita Shono, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 706 days.

(21) Appl. No.: 09/217,134
(22) Filed: Dec. 21, 1998
(65) Prior Publication Data

US 2002/0057470 A1 May 16, 2002

(30) Foreign Application Priority Data

Dec. 25, 1997 (JP) .............................................. 9/357267
Nov. 20, 1998 (JP) ........................................... 10/330924

(51) Int. Cl.$^7$ .............................................. G06F 15/00
(52) U.S. Cl. ........................................ 358/1.9; 358/1.4
(58) Field of Search ......................... 358/1.9, 1.4, 404, 358/444, 471, 500, 501

(56) References Cited

U.S. PATENT DOCUMENTS 6,057,866 A * 5/2000 Haneda et al.

FOREIGN PATENT DOCUMENTS

| JP | 411240202 A | * | 9/1999 | .............. B41J/2/44 |
| JP | 02001130125 A | * | 5/2001 | ............ B41M/3/14 |

* cited by examiner

Primary Examiner—Jerome Grant, II
(74) Attorney, Agent, or Firm—Fitzpatrick, Cella, Harper & Scinto

(57) ABSTRACT

An image recording apparatus includes at least one recording head, in which a plurality of solid-state recording elements are arranged, for performing image recording by causing each of the plurality of solid-state recording elements to record a pixel, a storage unit for storing correction data for correcting image data in accordance with a recording characteristic of each of the plurality of solid-state recording elements so as to correspond to the corresponding one of the plurality of solid-state recording elements. Each of the plurality of solid-state recording elements is driven in accordance with input image data and the correction data stored in the storage unit. The apparatus also includes a pattern-data generation unit for generating predetermined pattern data, and for causing each of a predetermined number of consecutive solid-state recording elements from among the plurality of solid-state recording elements to record a pixel based on the predetermined pattern data, a reading unit for reading a test pattern recorded by the recording head based on the pattern data generated by the pattern-data generation unit, an acquisition unit for acquiring the recording characteristic of each of the plurality of solid-state recording elements based on a ratio of a number of solid-state recording elements which have recorded pixels in accordance with the predetermined test pattern to a number of pixels of the test pattern read by the reading unit, and a changing unit for changing the correction data for each of the solid-state recording elements in accordance with the recording characteristic of the corresponding one of the solid-state recording elements acquired by the acquisition means. The image recording apparatus can exactly detect the recording characteristic of each of the plurality of solid-state recording elements, and prevent nonuniformly in density caused by individual difference in the recording characteristic during image recording.

33 Claims, 17 Drawing Sheets

FIG.9

| NUMBER OF READ LINES | MAGNIFICATION (SUB-SCANNING SPEED) |
|---|---|
| ~ 6982 | DISPLAY "REARRANGE SHEET" |
| 6983 ~ 6989 | 100.2% |
| 6990 ~ 6996 | 100.1% |
| 6997 ~ 7003 | USE CURRENT DATA |
| 7004 ~ 7010 | 99.9% |
| 7011 ~ 7017 | 99.8% |
| 7018 ~ | DISPLAY "REARRANGE SHEET" |

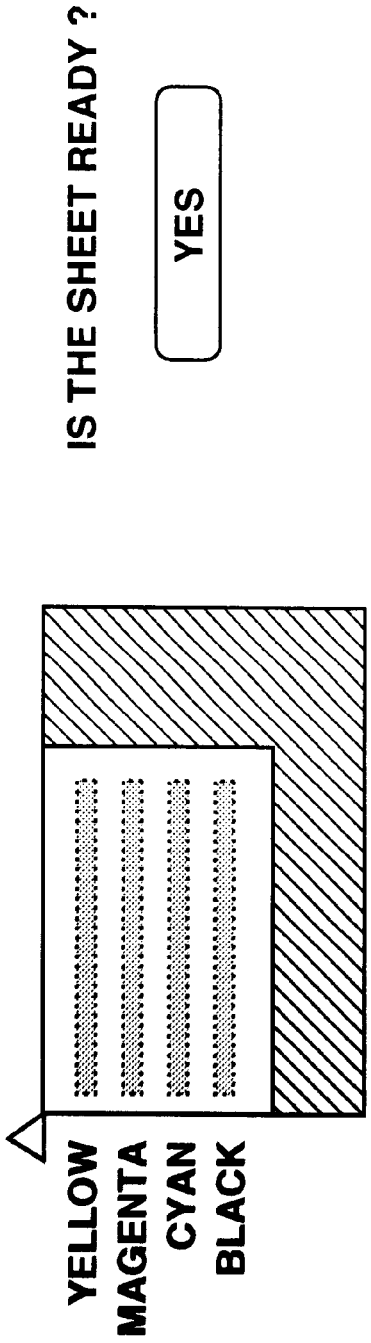

IMAGE RECORDING APPARATUS AND COPYING SYSTEM

BACKGROUND OF THE INVENTION

1. Field of the Invention

The present invention relates to an image recording apparatus for recording an image using solid-state recording elements.

2. Description of the Related Art

Image recording apparatuses for recording an image on a recording medium by driving respective elements of a solid-state-recording-element array head, in which, for example, thousands of light-emitting elements or heating elements are arranged in the form of an array, in accordance with image data have been well known. Since each of such solid-state recording elements has its peculiar recording characteristic, nonuniformity in density may occur in an image recorded by the elements. For example, when using thousands of light-emitting elements, all the elements do not always emit light with the same intensity even if they are driven by the same driving current. Accordingly, various attempts have been made in order to correct the recording characteristics of the solid-state recording elements.

In one approach, the recording characteristics of respective recording elements are measured in the device manufacturing process, and different correction data for the respective recording elements provided based on the measured characteristics are stored in order to perform appropriate correction when forming an image. However, the characteristics of the solid-state recording elements gradually change with the lapse of time. In order to deal with such changes with the lapse of time, it is desirable that the correction data can be easily changed by the user and correction corresponding to the latest recording characteristics of the solid-state recording elements is always performed.

For example, a technique for satisfying such requirements is described in Japanese Patent Laid-Open Application (Kokai) No. 5-42682 (1993). That is, in a copying system including an image reading unit and an image recording unit, a test pattern is recorded by driving solid-state recording elements, and correction data for each of the solid-state recording elements is changed by reading the test pattern by the image recording unit and detecting the density of a pixel recorded by each element. Since these operations can be easily performed by the user, changes in the recording characteristics of the respective recording elements with the lapse of time can be sufficiently dealt with.

However, for example, when applying the above-described technique to a so-called full-line-type solid-state-recording-element array head in which thousands of solid-state recording elements are arranged in the form of an array, various problems will arise. That is, even if the solid-state recording elements of the image recording unit and the reading elements of the image reading unit are arranged at the same density, the recording elements and the reading elements are not always in a 1:1 relationship due, for example, to error in the magnification of the optical system of the image reading unit, and inaccuracy in driving of a motor for driving the reading head comprising the reading elements or an automatic original-feeder. Hence, it is impossible, in some cases, to exactly detect the density of the pixel recorded by each recording element on the test pattern. If correspondence between the density read by each reading element and the corresponding recording element deviates, and correction data is changed based on the density detected in the deviated state, correction will become meaningless or even enhance nonuniformity in the density.

SUMMARY OF THE INVENTION

The present invention has been made in consideration of the above-described problems.

It is an object of the present invention to provide an image recording apparatus which can accurately acquire the recording characteristics of solid-state recording elements so as to follow changes in the recording characteristics with the lapse of time, and which can prevent nonuniformity in the density in a formed image due to variations in the recording characteristics.

According to one aspect, the present invention relates to an image recording apparatus including at least one recording head, in which a plurality of solid-state recording elements are arranged, for performing image recording by causing each of the plurality of solid-state recording elements to record a pixel, and storage means for storing correction data for correcting image data in accordance with a recording characteristic of each of the plurality of solid-state recording elements so as to correspond to the corresponding one of the plurality of solid-state recording elements. Each of the plurality of solid-state recording elements is driven in accordance with input image data and the correction data stored in the storage means. The apparatus also includes pattern-data generation means for generating predetermined pattern data, and for causing each of a predetermined number of consecutive elements from among the plurality of solid-state recording elements to record a pixel, reading means for reading a test pattern recorded by the recording head based on the pattern data generated by the pattern-data generation means, acquisition means for acquiring the recording characteristic of each of the plurality of solid-state recording elements based on a ratio of a number of solid-state recording elements which have recorded pixels in accordance with the predetermined test pattern to a number of pixels of the test pattern read by the reading means, and changing means for changing the correction data for each of the solid-state recording elements in accordance with the recording characteristic of the corresponding one of the solid-state recording elements acquired by the acquisition means.

According to another aspect, the present invention relates to a method for adjusting an image recording apparatus including at least one recording head, in which a plurality of solid-state recording elements are arranged, for performing image recording by causing each of the plurality of solid-state recording elements to record a pixel, and storage means for storing correction data for correcting image data in accordance with a recording characteristic of each of the plurality of solid-state recording elements so as to correspond to the corresponding one of the plurality of solid-state recording elements. Each of the plurality of solid-state recording elements is driven in accordance with input image data and the correction data stored in the storage means. The method includes a pattern-data generation step of generating predetermined pattern data, and causing each of a predetermined number of consecutive solid-state recording elements from among the plurality of solid-state recording elements to record a pixel based on the predetermined pattern data, a reading step of reading a test pattern recorded by the recording head based on the pattern data generated in the pattern-data generation step, an acquisition step of acquiring the recording characteristics of each of the plurality of solid-state recording elements based on a ratio of a number of solid-state recording elements which have recorded pixels in accordance with the predetermined test pattern to a number of pixels of the test pattern read in the reading step, and a changing step of changing the correction data for each of the solid-state recording elements in accordance with the recording characteristic of the corresponding one of the solid-state recording elements acquired in the acquisition step.

According to still another aspect, the present invention relates to a copying system including reading means for reading an original and outputting image data, at least one recording head, in which a plurality of solid-state recording elements are arranged, for performing image recorded by causing each of the plurality of solid-state recording elements to record a pixel, and storage means for storing correction data for correcting image data in accordance with a recording characteristic of each of the plurality of solid-state recording elements so as to correspond to the corresponding one of the plurality of solid-state recording elements. Each of the plurality of solid-state recording elements is driven in accordance with the image data output from the reading means and the correction data stored in the storage means. The system also includes pattern-data generation means for generating predetermined pattern data, and for causing each of a predetermined number of consecutive solid-state recording elements from among the plurality of solid-state recording elements to record a pixel, acquisition means for causing the reading means to read a test pattern recorded by the recording head based on the pattern data generated by the pattern-data generation means, and for acquiring the recording characteristic of each of the plurality of solid-state recording elements based on a ratio of a number of solid-state recording elements which have recorded pixels in accordance with the predetermined test pattern to a number of pixels of the test pattern read by the reading means, and changing means for changing the correction data for each of the solid-state recording elements in accordance with the recording characteristics of the corresponding one of the solid-state recording elements acquired by the acquisition means.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 9 is a table illustrating a relationship between the number of read lines of the test pattern and the magnification of reading in the second embodiment;

FIG. 11 is a diagram illustrating an example of display on an operation unit in the second embodiment;

DETAILED DESCRIPTION OF THE PREFERRED EMBODIMENTS

First Embodiment

Figure 1:
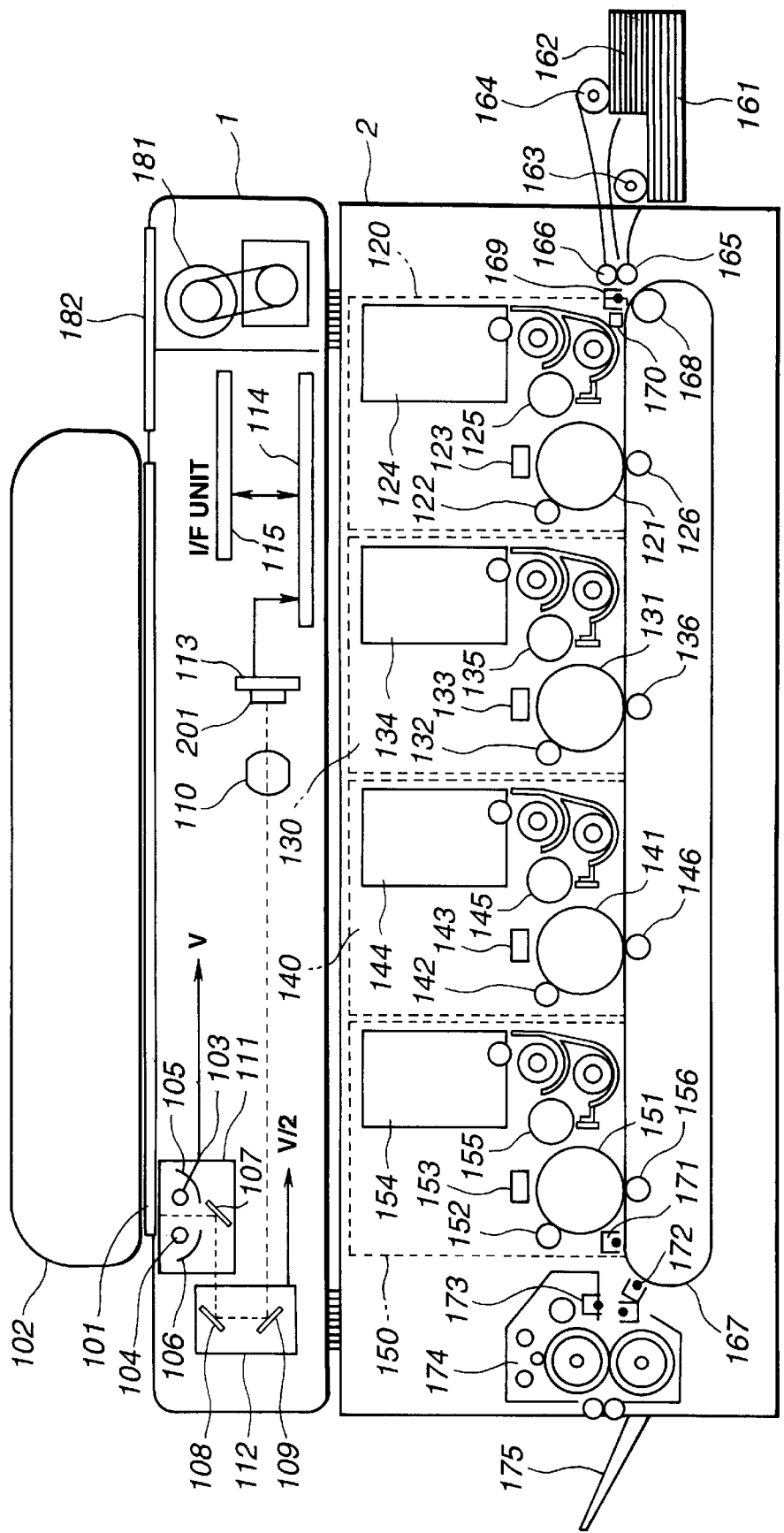
FIG. 1 is a cross-sectional view of an image recording apparatus according to the present invention.

A description will now be provided of a copying system, serving as an image recording apparatus which adopts light-emitting elements as solid-state recording elements, according to a first embodiment of the present invention will reference to FIG. 1.

In FIG. 1, the copying system is grossly separated into a reader unit 1 and a printer unit 2.

First, the reader unit 1 will be described. In FIG. 1, there are shown a original-mount glass 101 for mounting an original thereon, an automatic original-feeding device 102, light sources 103 and 104, such as tungsten halogen lamps, fluorescent lamps or the like, for illuminating the original, reflecting shades 105 and 106 for condensing light from the light sources 103 and 104, respectively, mirrors 107–109 for reflecting light reflected from the original, a lens group 110, and a CCD 201 (to be described later). The light sources 103 and 104, and the reflecting shades 105 and 106 are accommodated within a cartridge 111, and the mirrors 108 and 109 are accommodated within a cartridge 112. A mirror-surface pressing plate or a white-surface pressing plate may be mounted instead of the automatic original-feeding device 102.

The carriages 111 and 112 mechanically move in the direction of arrows, i.e., in a direction perpendicular to the electric scanning (main scanning) direction of the CCD 201, at speeds of v and v/2, respectively, in accordance with the revolution of a carriage driving motor 171, so that the entire surface of the original is scanned (sub-scanning). Light reflected from the original mounted on the original-mount glass 101 is focused onto the CD 201, and image data for the original is obtained as an electric signal. The CCD 201 is disposed on a substrate 113, and an image processing unit (to be described later) is disposed on a substrate 114. An I/F (interface) unit 115 communicates with an external apparatus. An operation unit 182 is used for displaying the state of the apparatus or operating the apparatus.

Next, the printer unit 2 will be described. The printer unit 2 is an electrophotographic printer which adopts light-emitting-element chips, such as LEDs (light-emitting diodes) or the like, constituting an image recording head. Four image recording units, each including a photosensitive drum, an image recording head and the like, are provided so as to correspond to four colors, i.e., Y (yellow), M (magenta), C (cyan) and K (black). These image recording units are arranged in series at a predetermined interval. By transferring Y, M, C and K toner images recorded on corresponding photosensitive drums onto the same recording medium (recording sheet), which is conveyed at a constant speed, in a superposed state, a full-color image is recorded. That is, a so-called 4-drum tandem arrangement method is adopted.

In FIG. 1, reference numerals 120, 130, 140 and 150 represent a Y-image recording unit, an M-image recording unit, a C-image recording unit and a K-image recording unit for recording Y, M, C and K images, respectively. Since these units have the same configuration, The Y-image recording unit 120 will be described in detail.

In the Y-image recording unit 120, there are shown a photosensitive drum 121 serving as an image bearing member, a primary charger 122, a recording head 123 (to be described later), a developing unit 124, a sleeve 125 provided within the developing unit 124, and a transfer unit 126. In the Y-image recording unit 120 having the above-described configuration, first, the surface of the photosensitive drum 121 is uniformly charged by the primary charger 122. Then, the recording head 123 performs exposure corresponding to image data for recording a Y image, and an electrostatic latent image is thereby recorded. 7,168 light-emitting elements are arranged in the form of an array with a density of 600 dpi (dots per inch) within the recording head 123. These light-emitting elements are selectively lit in accordance with image data provided in a manner to be described later, so that each lit element records a pixel on the facing portion of the photosensitive drum 121. The light-emitting element array has a length corresponding to the shorter width of an A3-size sheet, so that an image can be recorded on an A3-size sheet as the largest size image. The electrostatic latent image thus formed is developed by the developing unit 124 to provide a Y toner image. Although the Y-image recording unit 120 is described, a toner image having a corresponding color is, of course, recorded on each of other image recording units.

Sheets of a recording medium accommodated in a cassette 161 or 162 are individually picked up by a pickup roller 163 or 164, respectively. The picked up sheet is fed onto a transfer belt 167 by sheet feeding rollers 165 and 166, and is attracted on the transfer belt 167 by a transfer roller 168 and an attracting charger 169. The leading edge of the sheet thus attracted on the transfer belt 167 is detected by a sheet-end sensor 170. A detection signal obtained from the sheet-end sensor 170 is transmitted to the reader unit 1, and is used, for example, for controlling a timing for transmitting image data.

Then, the sheet is conveyed to the left at a constant speed. When the sheet passes through the image recording units 120, 130, 140 and 150, the Y, M, C and K toner images recorded in the above-described manner are sequentially transferred onto the sheet by transfer chargers 126, 136, 146 and 156, respectively, in a superposed state. After the K toner image has been transferred by the transfer charger 156 within the K-image recording unit 150, charges on the sheet having the Y, M, C and K toner images transferred thereon are removed by a charge removing charger 171. Then, the sheet is separated from the transfer belt 167. At that time, a peeling charger 172 prevents disturbance in the obtained image due to peeling discharge. The separated sheet is charged by a charger before fixing 173 in order to reinforce the toner's attracting force. Then, the toner image is fixed by heat by a fixing unit 174, and the sheet is discharged onto a discharged-sheet tray 175.

Figure 2:
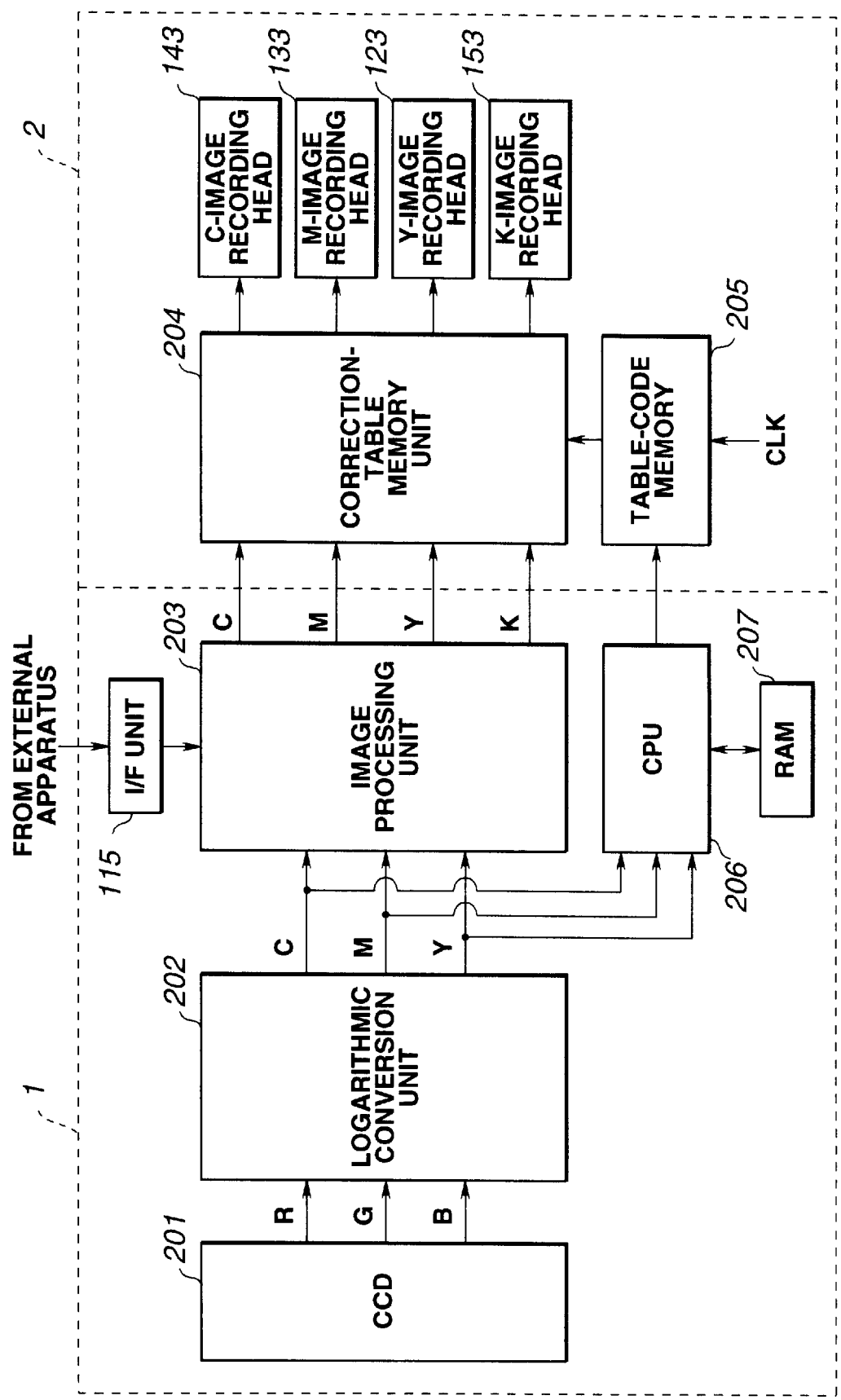
FIG. 2 is a block diagram illustrating signal processing in a first embodiment of the present invention.

Next, a description will be provided of signal processing shown in the block diagram of FIG. 2.

The CCD 201 reads the original on the original-mount glass 101 in the above-described manner, and outputs image data represented by luminance of R (red), G (green) and B (blue) colors. In the CCD 201, charge-coupled-device elements, serving as reading elements, read the original, for example, with a resolution of 600 dpi. A 1-line sensor in which R, G and B color filters are sequentially provided for the charge-coupled-device elements arranged at 1,800 dpi, or a 3-line sensor in which charge-coupled-device elements are arranged at 600 dpi in three rows, and R, G and B filters are provided on the respective rows may be used as the CCD 201. The image data obtained from the CCD 201 by reading the original in the above-described manner is converted into image data represented by C, M and Y density values by a logarithmic conversion unit 202. The image data is then subjected to various types of processing by an image processing unit 203 so as to be converted from the image data represented by density values for three components, i.e., C, M and Y, into image data represented by density values for four components, i.e., C, M, Y and K, corresponding to C, M, Y and K toner density values, and the resultant image data is input to a data correction unit 205. In this copying system, it is possible to perform image recording based on image data transmitted from an external apparatus, such as a host computer, a facsimile apparatus or the like, as well as based on the image data input form the CCD 201. Such image data is input to the image processing unit 203, for example, via the I/F unit 115.

A correction-table memory unit 204 performs correction based on by which light-emitting element image data representing the density of each pixel is recorded. That is, as described above, in order to correct the light-emitting characteristic of each light-emitting element, the density level of image data is corrected in accordance with a correction table corresponding to the light-emitting element, and the corrected image data is output to the corresponding one of image recording heads 123, 133, 143 and 153.

A plurality of correction tables corresponding to the light-emitting characteristic of the light-emitting element are stored in advance in the correction-table memory unit 204. The output level after correction corresponding to the input density level is stored in each of the plurality of correction tables. The table-code memory 205 comprises a RAM, which stores a table code of the correction table corresponding to each light-emitting element. The contents of the table-code memory 205 can be changed by processing to be described later. The table-code memory 205 counts clock pulses, and generates a table code stored in advance so as to correspond to the light-emitting element corresponding to the pixel to be corrected by the correction-table memory unit 204. Output data is determined in accordance with the table code and input data.

A CPU (central processing unit) 206 performs processing of changing correction data for each light-emitting element as will be described later, and is connected to a RAM 207.

The image data thus corrected is input to corresponding one of a C-image recording head 143, an M-image recording head 133, a Y-image recording head 123, and a K-image recording head 153, and light-emitting elements selectively emit light in accordance with the image data.

Figure 3:
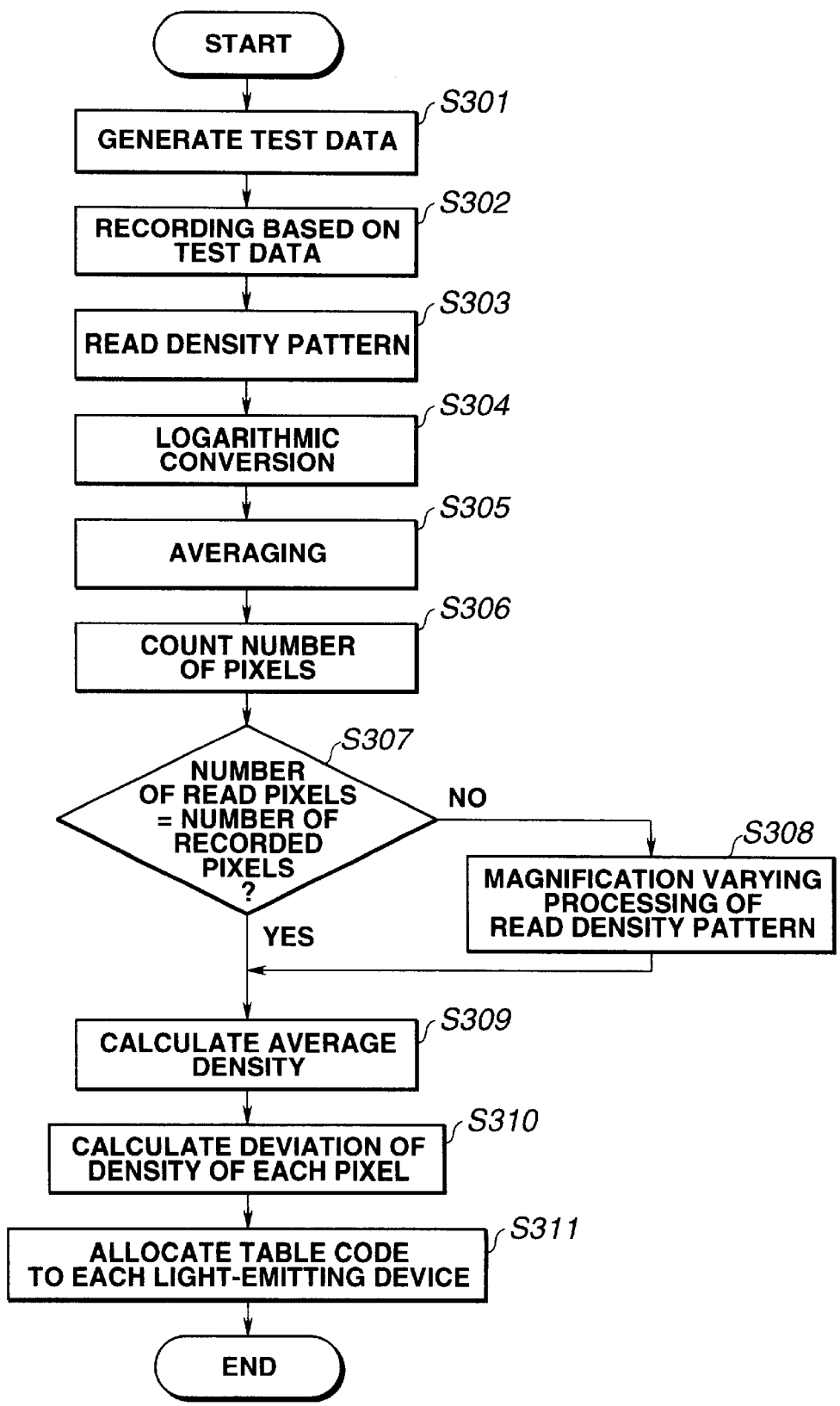
FIG. 3 is flowchart illustrating processing of changing correction data in the first embodiment.
Figure 4:
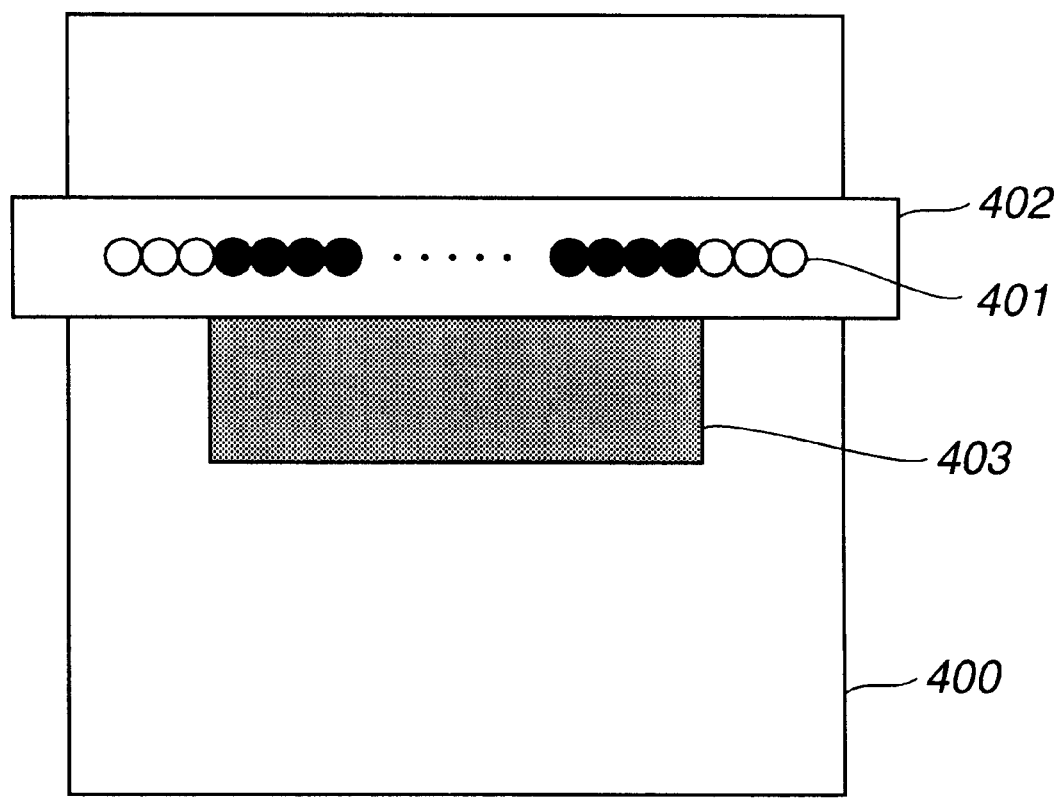
FIG. 4 is a diagram illustrating a positional relationship between a recording head and a density pattern in the first embodiment.
Figure 5:
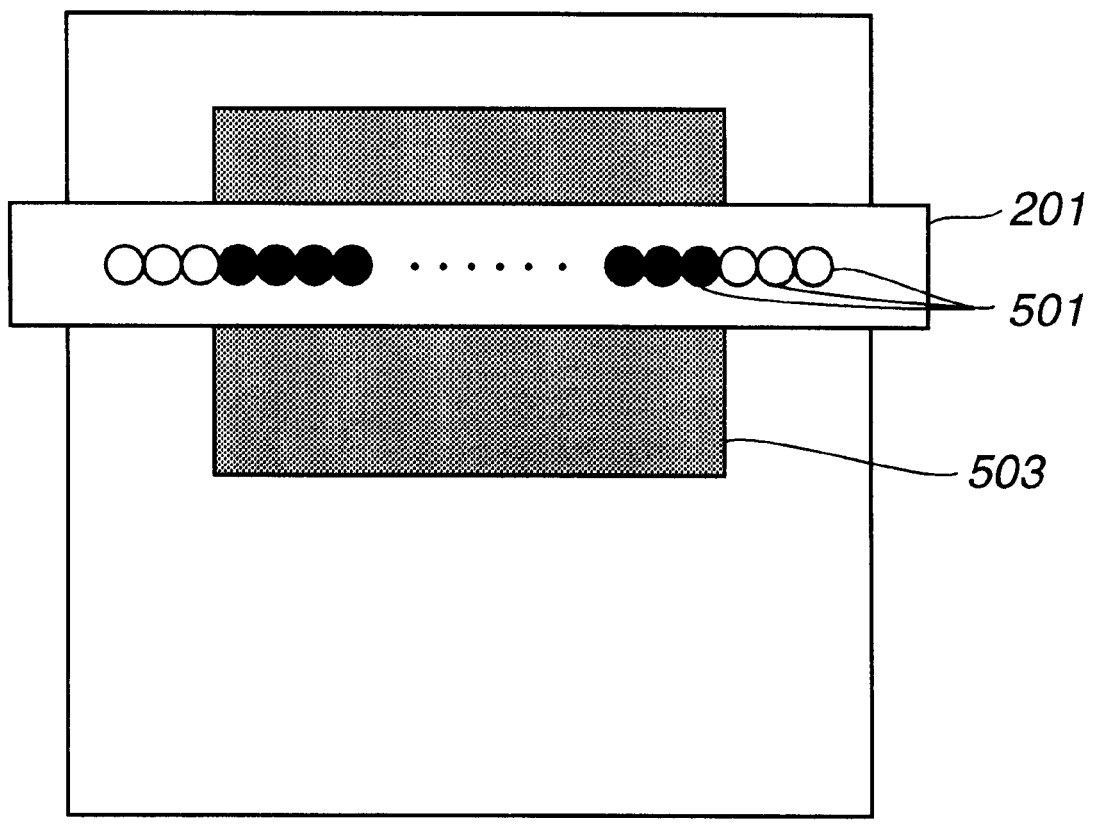
FIG. 5 is a diagram illustrating a positional relationship between a CCD (charge-coupled device) and a density pattern in the first embodiment.

Next, a description will be provided of processing of changing correction data for each light-emitting element with reference to FIGS. 3 through 5. In the first embodiment, correction data itself is not changed for each light-emitting element. Instead, a plurality of correction tables are prepared in advance, and a table code for a correction table suitable for the light-emitting characteristic of each light-emitting element is allocated and stored. When correcting image data, a correction table corresponding to the allocated table code is used. In the first embodiment, for example, first, correction data for C is changed, and then, correction data is sequentially changed for M, Y and K. A procedure for changing correction data for C will now be described.

First, the image processing unit 203 generates a test-pattern data for recording an entirely black halftone image in order to form a test pattern (step S301). For example, when image data comprises 8 bits, i.e., 256 gradations 00hFFh, a 80h entirely black image may be used as the test pattern. When changing correction data for C, a monochromatic test pattern having only C may be recorded. When changing correction data for M, Y or K, a monochromatic test pattern having only M, Y or K, respectively, may also be used. Then, the test pattern is recorded by corresponding one of the image recording units 120, 130, 140 and 150 based on the image data (step S302). That is, the test pattern is formed on a recording sheet by recording pixels based on the image data by light-emitting elements of the concerned recording head. At that time, correction is not performed by skipping the correction-table memory unit 204. FIG. 4 illustrates a positional relationship between the recording head and the test pattern when recording the test pattern. In FIG. 4, reference numeral 401 represents a plurality of solid-state recording elements arranged in a direction (main scanning direction) perpendicular to the sheet feeding direction (sub-scanning direction), and reference numeral 402 represents the recording head. A predetermined number of consecutive solid-state recording elements (indicated by black circles) from among the plurality of solid-state recording elements record pixels. By providing the predetermined number of light-emitting elements with uniform data 80h, a test pattern 403 corresponding to the light-emitting characteristics of the respective light-emitting elements is obtained. FIG. 4 is a diagram for the convenience of description. Actually, as described above, the recording head performs recording on the photosensitive member, instead of performing recording directly on the recording sheet.

Then, the test pattern thus recorded on the recording sheet is read by the CDD 201 (step S303). For a C test image, it is unnecessary to read all color components R, G and B. It is necessary to read only an R component. Similarly, it is necessary to read only a G component, a B component and a G component for an M test pattern, a Y test pattern and a K test pattern, respectively. FIG. 5 illustrates a positional relationship between the CCD and the test pattern when reading the test pattern. In FIG. 5, the CCD 201 is shown. Reference numeral 501 represents a plurality of reading elements arranged in the CCD 201 in the main scanning direction. Reading elements which detect the density from among the plurality of reading elements are indicated by black circles. The recording sheet having the test pattern recorded thereon is mounted on the original-mount glass 101 so that the direction of arrangement of the plurality of recording elements which have recorded the test pattern is the same as the direction of arrangement of the plurality of reading elements for reading the test pattern. FIG. 5 is a diagram for the convenience of description. Actually, as described above, the CCD 201 reads the recording sheet via various optical systems instead of directly reading the recording sheet. A test pattern 503 obtained from the test pattern 403 shown in FIG. 4 as a result of magnification change, for example, due to error in the magnification of each of the various optical systems is read by the CCD 201. Image data thus obtained and represented by R, G and B luminance data is converted into density data by the logarithmic conversion unit 202 (step S304), and the obtained density data is output to the CPU 206.

The CPU 206 calculates the mean value of the density values read by the respective reading elements by storing image data of the test pattern in the working RAM 207 and averaging the image data in the sheet feeding direction (sub-scanning direction) (step S305). Then, the number of reading elements which have detected density values of the test pattern from among the plurality of reading elements, i.e., the number of reading elements indicated by black circles in FIG. 5, is counted (step S306). In this operation, the CPU 206 sequentially compares the density values of respective pixels with a predetermined threshold in the sub-scanning direction in the working RAM 207. The counting is started when a density value exceeds the threshold, and is terminated when a density value becomes less than the threshold.

Then, the CPU 206 determines if the count number of pixels equals the number of light-emitting elements which have recorded the test pattern (step S307). If the result of the determination in step S307 is negative, the ratio of the count number to the number of the light-emitting elements is calculated. Then, by performing magnification varying processing (reduction or magnification) of the read test pattern one-dimensionally in the main scanning direction, the number of pixels of the test pattern is made to be equal to the number of light-emitting elements which have recorded the pixels of the test pattern. Thus, the density of the pixel recorded by each recording element is detected (step S308). Well-known thinning processing or interpolation processing may be adopted as the magnification varying processing.

Then, the CPU 206 calculates the mean value of the density values of pixels recorded by the respective lighte-emitting elements which have been detected in the above-described manner (step S309), and also calculates the deviation of the density value of each pixel (step S310). A table code of the correction table is allocated to each light-emitting element in accordance with the deviation, and is stored in the table-code memory 205 so as to correspond to each recording element (step S311), and the processing of changing correction data is terminated.

In this processing, instead of repeating recording and reading of a test image for each of C, M, Y and K, test images for the four colors may be sequentially recorded on a single recording sheet, and correction data for the four colors may be changed at a time by reading the recording sheet.

In the first embodiment, a plurality of correction tables are prepared in advance, one of correction tables is allocated to each recording element in accordance with the recording characteristic of the recording element, and a table code representing the allocated correction table is stored so as to correspond to the recording element. In another aspect, a correction table for input various output may be appropriately formed and changed in accordance with the recording characteristic of each recording element.

According to the first embodiment, it is possible to exactly detect the density value of each pixel recorded by one of the solid-state recording elements, exactly change correction data for each solid-state recording element, and thereby prevent nonuniformity in density.

Second Embodiment

A second embodiment of the present invention will now be described.

Figure 6:
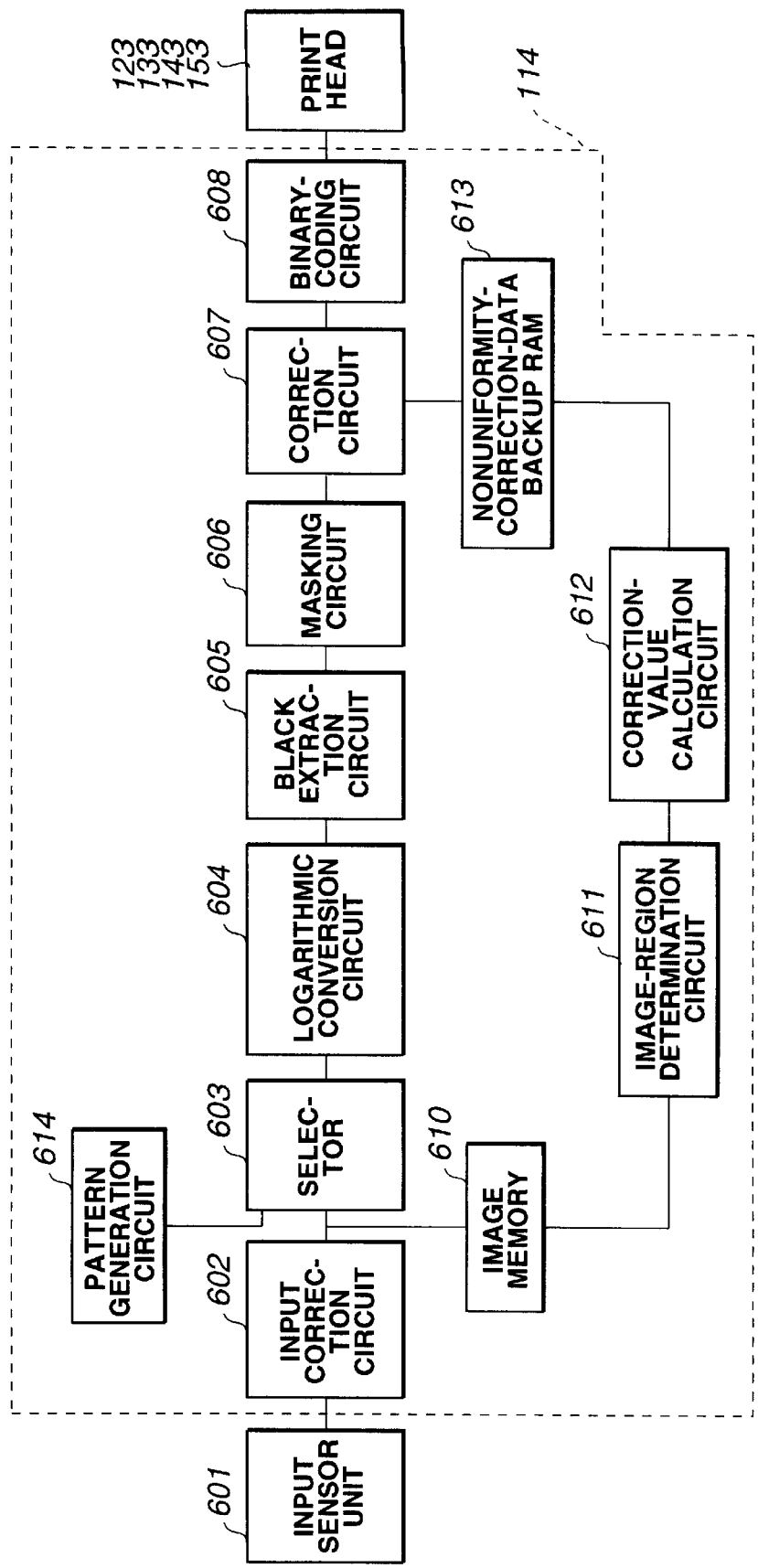
FIG. 6 is a block diagram illustrating signal processing in a second embodiment of the present invention.

FIG. 6 is a block diagram illustrating the detailed configuration of a processing circuit mounted on a processing-circuit substrate according to the second embodiment.

An original mounted on the original-mount glass 101 reflects light from the light sources 103 and 104. The reflected light is guided to the CCD 201 to be converted into an electric signal. When the CCD 201 comprises a color sensor, the CCD 201 may have a configuration in which R, G and B color sensors are disposed on a 1-line CCD in the order of R, G and B, a configuration in which R, G and B filters are arranged on corresponding one of 3-line CCDs, a configuration in which R, G and B filters are integrally formed on a CCD chip, or a configuration in which R, G and B filters are provided separately from a CCD or CCDs. The electric signal (analog image signal) is subjected to predetermined processing, and is subjected to A/D (analog-to-digital) conversion to be converted, for example, into 8-bit R, G and B digital signals. Image data of the original read by the CCD 201 is sequentially transmitted to an input correction circuit 602. The input correction circuit 602 quantizes image data for each pixel into digital data, and perform shading correction for correcting nonuniformity in the sensitivity of the CCD 201 and nonuniformity in illuminance by the illuminating light sources, and the like according to digital calculating processing.

A selector 603 selects one of input image data and a test pattern (to be described later), and transmits the selected data to image processing circuitry at the subsequent stage. A logarithmic conversion circuit 604 converts the R, G and B image data into C, M and Y data using a look-up table. A black extraction circuit 605 extracts a black component. A masking circuit 606 performs masking processing corresponding to the coloring characteristic of toner (or ink).

A correction circuit 607 corrects image data based on correction data corresponding to the recording characteristic of each recording element obtained by a method to be described later, in order to cancel variations in the recording characteristics of recording elements. A binary-coding circuit 608 quantizes multivalue image data into binary data. Recording heads 123, 133, 143 and 153 form Y, M, C and K images, respectively. Each of the recording heads 123, 133, 143 and 153 includes a light-emitting-element array in which a plurality of light-emitting elements, serving as recording elements, are arranged in the form of an array. Each light-emitting element of the light-emitting-element array is subjected to on/off control based on the binary data transferred from the binary-coding circuit 608.

A pattern generator 614 generates test-pattern data. An image memory 610 stored read density data. An image-region determination circuit 611 determines a recorded region from the read density data. A correction-value calculation circuit 612 calculates nonuniformity correction data from the density data. A RAM 613 backs up the calculated nonuniformity correction data.

Nonuniformity correction according to the second embodiment will now be described.

Figure 7:
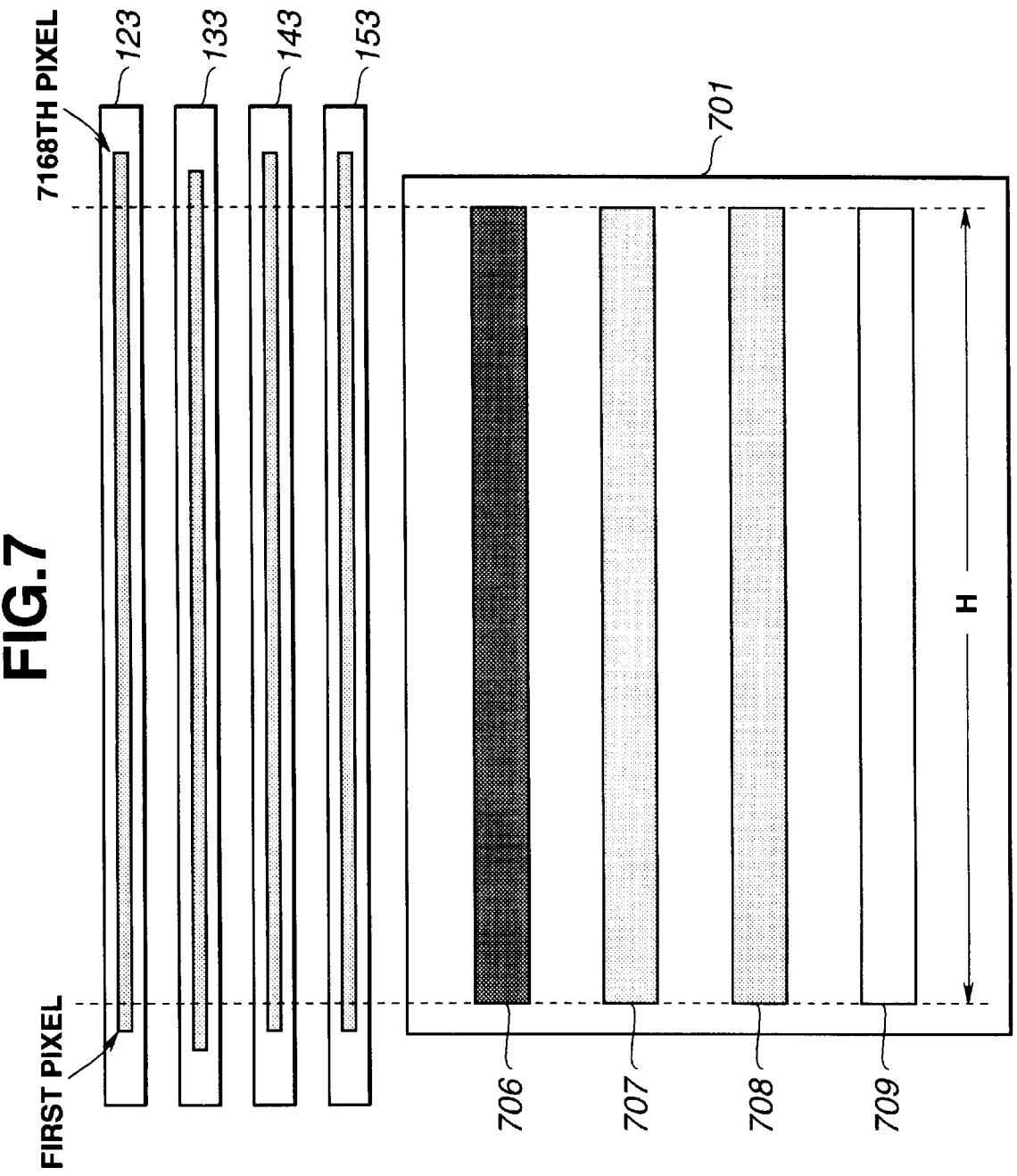
FIG. 7 is a diagram illustrating a test pattern in the second embodiment.

FIG. 7 illustrates a relationship between each recording head and the recorded test pattern when performing nonuniformity correction. The recording head 123 records a test pattern having a specific density value generated by the pattern generation circuit 614 at a position 709 on a recording sheet 701. The recording head 133 records a test pattern having a specific density value generated by the pattern generation circuit 614 at a position 708 on the recording sheet 701. The recording head 143 records a test pattern having a specific density value generated by the pattern generation circuit 614 at a position 707 on the recording sheet 701. The recording head 153 records a test pattern having a specific density value generated by the pattern generation circuit 614 at a position 706 on the recording sheet 701. These test patterns are recorded so as to provide blanks at both ends on the recording sheet 701 within the width corresponding to 7,168 recordable elements of each recording head. At that time, the recording width is made to be equal to or larger than an ordinary recording width by the recording head. A region where the test patterns is recorded is commonly used for the printer and the image processing unit. In the second embodiment, the recording heads 123, 133, 143 and 153 perform recording from the 5th pixel to the 7,400th pixel, from the 7th pixel to the 7,006th pixel, from the 11th pixel to the 7010th pixel, and from the 9th pixel to the 7,008th pixel, respectively. That is, each of the recording heads records the corresponding test pattern on the same recording sheet by lighting 7,000 light-emitting elements.

Next, a method for reading the density of the test pattern recorded by the printer unit 2 in the above-described manner by the reader unit 1 will be described in detail.

Figure 8:
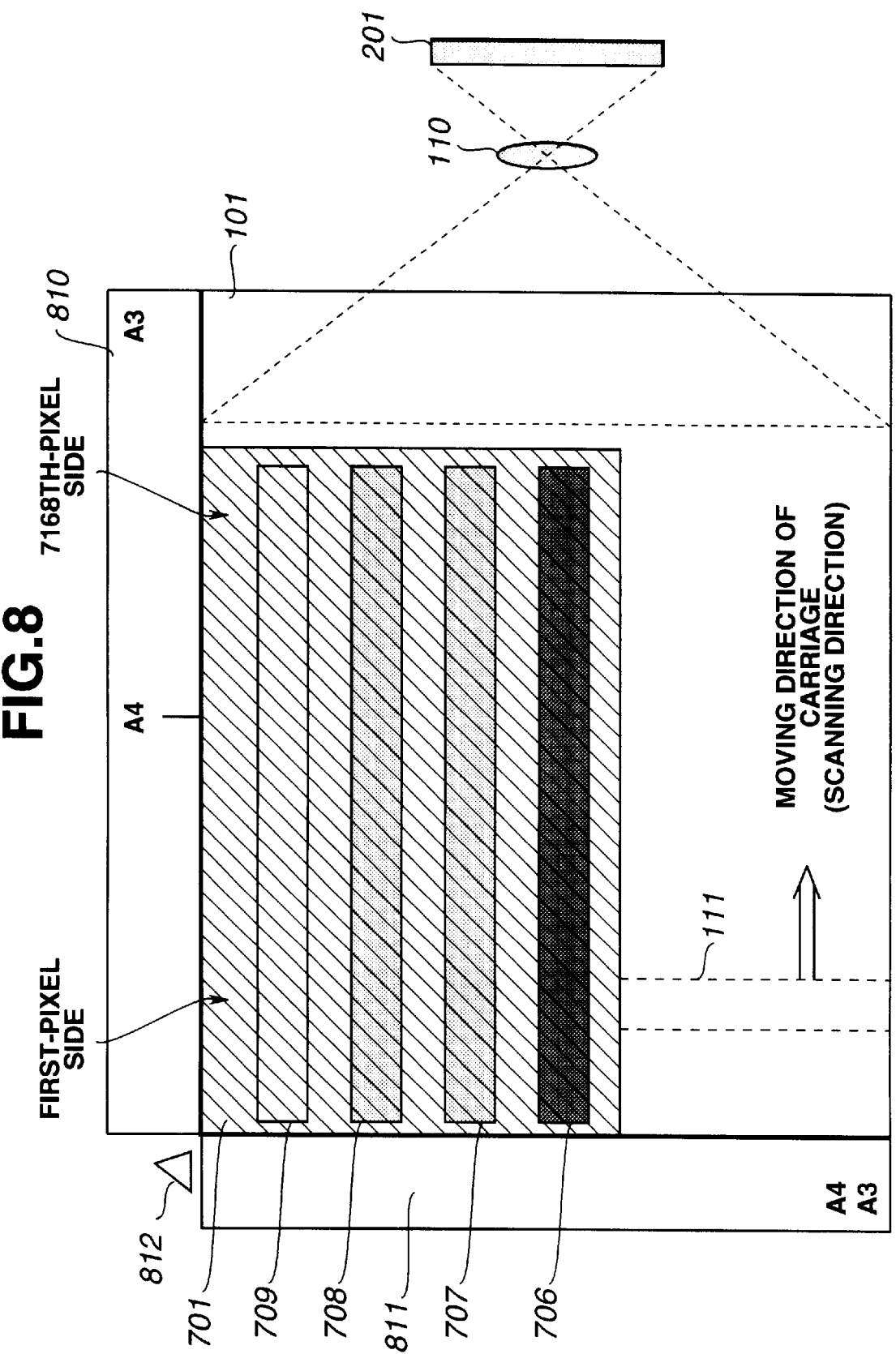
FIG. 8 is a diagram illustrating a manner in which the test pattern is mounted on original-mount glass in the second embodiment.

FIG. 8 is a diagram illustrating a state in which the recording sheet having the test pattern formed thereon is mounted on the original-mount glass 101. In FIG. 8, the sizes of originals are marked on position index plate 810 and 811 for placing an original on the original-mount glass 101. In the second embodiment, only A4 and A3 sizes are marked. Reference numeral 812 represents a contact reference for the original. The recording sheet 701 is placed in a state in which the recording surface is downward and the recorded region 709 for yellow is near the contact reference 812. In this state, the first pixel recorded by each recording head is present near the position index plate 811. Recording is performed on the recording sheet 701 as large as possible within the width of the recording head. In the case of a printer capable of recording an A3-size image, when recording has been performed by moving an A4-size sheet in a direction perpendicular to the longer side as shown in FIG. 7, the sheet is mounted on the original-mount glass 101 by rotating it by 90 degrees. That is, the recording sheet 701 having the test pattern recorded thereon is mounted on the original-mount glass 101 so that the direction of arrangement of the plurality of light-emitting elements which have recorded the test pattern is perpendicular to the direction of arrangement of the plurality of reading elements for reading the test pattern.

Next, reading of the test pattern will be described.

After starting reading of the recording sheet 701 in this state, the density value in the shorter side of the pattern 709 except white regions are averaged, and the mean value for each line is stored in the image memory 610. The averaging is performed because respective pixels on the same line, i.e., in the direction of arrangement of reading elements of the CCD 201, in the read test pattern have been recorded by the same light-emitting element. If addresses of the image memory 610 are made to sequentially correspond to read lines, data corresponding to no recording is stored for addresses 0—about 60 (2.5 mm with reading of about 600 dpi) of the image memory 610 because recording is not performed in this region, and then average data corresponding to the density of the pattern 709 is stored for each line.

Then, the image-region determination unit 611 calculates the number of lines where density has been detected, using the data stored in the image memory 610. If the number of lines where density has been detected substantially equals the number of recording elements 7,000 which have actually recorded the test pattern, the process proceeds to the next step, where the light-emitting characteristic of each light-emitting element is acquired using the density data. On the other hand, if the number of lines where density has been detected is less than or more than 7,000, the ratio of the number of pixels of the density pattern to the number of light-emitting elements which have recorded the test pattern is calculated. The reading condition of the reader unit 1 is changed in accordance with the ratio, and the test pattern is again read. FIG. 9 illustrates the relationship between the number of read lines and the magnification.

Next, a description will be provided of a method for controlling the reading condition when changing the reading condition and again reading the test pattern.

In the second embodiment, by changing the moving speed, i.e., the original-scanning speed, of the carriages 111 and 112 during a reading operation in accordance with the multiplication obtained in the above-described manner, the number of pixels of the read test pattern is changed so as to coincide with the number of light-emitting elements which have recorded the test pattern.

Figure 15:
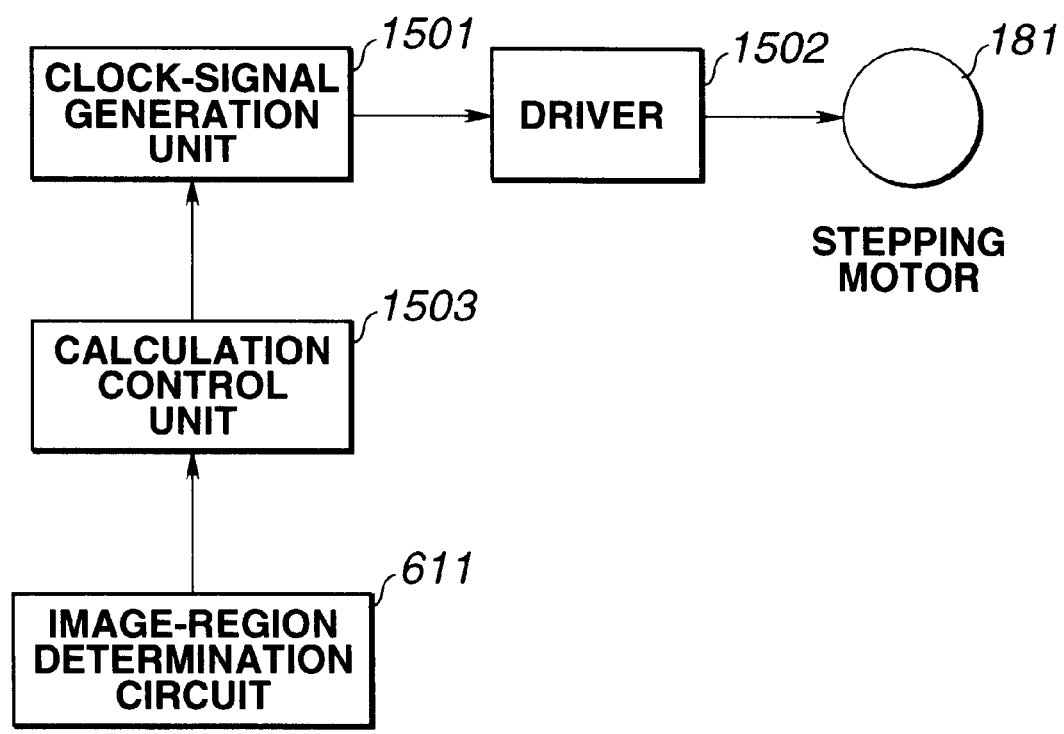
FIG. 15 is a diagram illustrating circuitry for controlling a motor in the second embodiment.

FIG. 15 is a block diagram illustrating control by a motor 181 for moving the carriages 111 and 112. The motor 181 shown in FIG. 15 is the motor shown in FIG. 1, and comprises a stepping motor in the second embodiment. In order to simplify the description, it is assumed that, when a signal having a frequency of 1,000 Hz is generated from a clock generation unit 1501, a driver 1502 causes the motor 181 to revolve at a 100% speed. The revolution of the motor 181 changes in proportion to the frequency of the signal generated from the clock generation unit 1501. Hence, if the clock generation unit 1501 generates a signal having a frequency of 1,001 Hz, the motor 181 revolves so as to provide 99.9% reading (speed-up). The revolution speed of the motor 181 is set by a calculation control unit 1503 based on the above-described result of calculation.

Next, a description will be provided of a method for acquiring the light-emitting characteristic of each light-emitting element based on the density data obtained in the above-described manner.

When the number of recorded lines obtained at the first reading or the second reading is 6997–7003, the process proceeds to the calculation of correction data using read data stored in the image memory 610 at that time.

When calculating correction data, the address of the center position of read data "dcenter" is obtained from the address of the leading edge of the read line "dstart" and the address of the trailing edge of the read line "dend":

$$d\text{center}=(d\text{start}+d\text{end})/2.$$

Each position is specified on data recorded by each recording element making the center position "dcenter" a reference. Then, smoothing (moving average) processing of data is performed:

$$p(j)=(h(j-1)+h(j+1))/3,$$

where h(j) is the value of j-th recorded data.

This smoothing processing is performed, for example, in order to reduce error in the position in the reading operation, or deal with signal responsiveness during a binary-coding operation.

Then, segmenting of density data corresponding to each recording element is performed:

$$q(k)=p(d\text{center}-3,500+k),$$

where k represents the position of each recording element.

If the total number of the recording elements is 7,000, the position "dcenter" is 3,500. Correction data r(k) is obtained from data q(k) corresponding to the density of each recording element:

$$r(k)=100-(100\times q(k))/T)+s(k).$$

That is, a variation in the density with respect to a predetermined value T is represented by percentage, and the correction value is changed in accordance with the percentage value. The value T corresponds to the recording density of a recording element which has a reference γ-curve characteristic.

The value s(k) is the value set in the nonuniformity-correction-value backup RAM 113 when the test pattern has been reduced. It is possible to set either correction data at the preceding correction or averaging data as the value s(k). The correction data r(k) indicating the light-emitting characteristic of each light-emitting element obtained in the above-described manner is stored in corresponding one of RAMs 1205–1208 (to be described later) instead of correction data which has been stored.

Figure 10A:
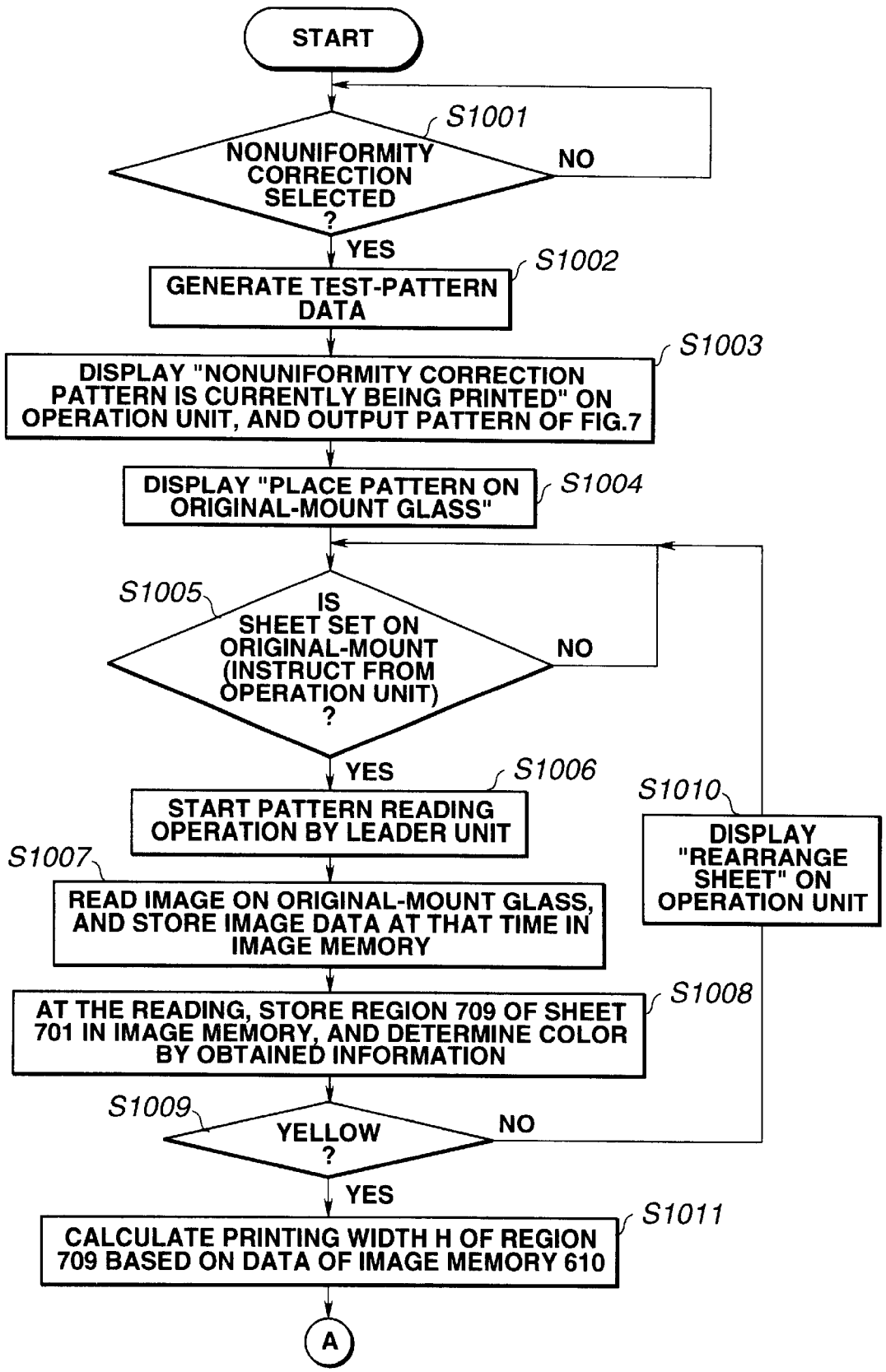
FIG. 10 which consists of FIGS. 10A and 10B is a flowchart illustrating the operation of the second embodiment.
Figure 10B:
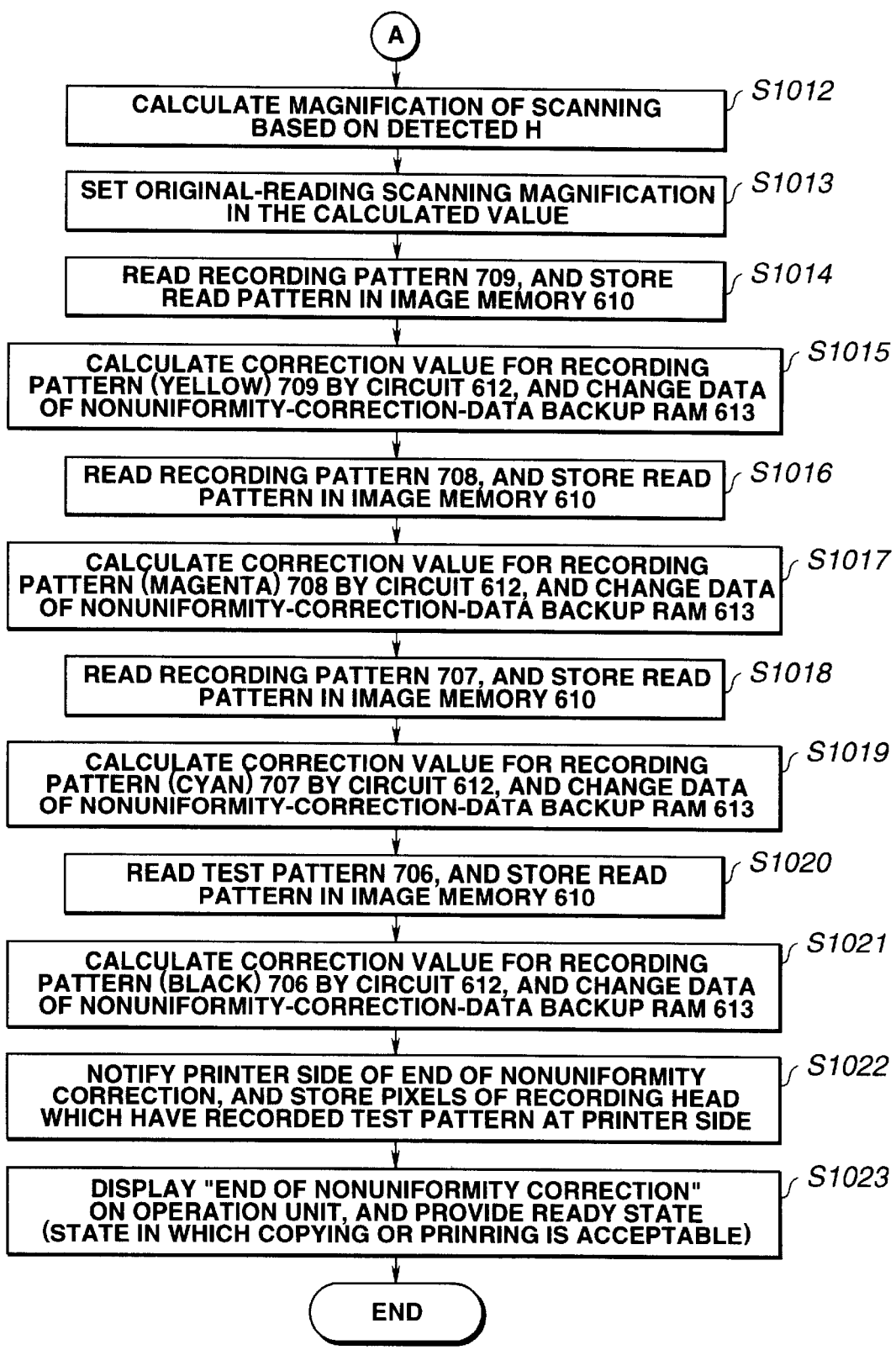

FIG. 10 is a flowchart illustrating the operation when performing the above-described nonuniformity correction of the recording head in the apparatus.

First, in step S1001, it is determined if nonuniformity correction has been selected through the operation unit 182. If the result of the determination in step S1001 is affirmative, the process proceeds to step S1002, where the pattern generation circuit 614 generates test-pattern data for nonuniformity correction. At that time, in conventional ink-jet printers, data at the 128th level from among 156 gradation levels (a value corresponding to the exactly mid value) is generated as the test-pattern data. In contrast to the ink-jet printer, in the electrophotographic printer used in the second embodiment, it has become clear that an optimum density level is present for each color instead of the mid value due, for example, to the surface property of toner. Hence, in the second embodiment, the pattern generation circuit 614 generates the patterns 706–709 shown in FIG. 7 for each color with optimum density values. In step S1003, in order to actually print the test pattern by the printer unit 2, a display indicating that the test pattern is being recorded is performed on the operation unit 182. Upon completion of recording of the test pattern, then, in step S1004, a guidance display for the operator indicating that the recording sheet is to be mounted in a predetermined direction on the original-mount glass 101. FIG. 11 illustrates an example of the guidance display. Then, in step S1005, the operator is asked if the recording sheet is placed on the original-mount glass 101. When the recording sheet has been placed on the original-mount glass 101, "YES" shown in FIG. 11 is depressed, and the process proceeds to step S1006, where an operation of reading the test-pattern data by the reader unit 1 is started. Then, in step S1007, by scanning the surface of the original-mount glass 101, the region 709 (or a region from among the regions 706–708) is read, and obtained image data is stored in the image memory 610 by averaging the image data in the direction of the line of the CCD 201. Then, in step S1008, the color of the test pattern is determined based on the data stored in the image memory 610 (determination of white data when the sheet is placed in the reverse direction). Then, in step S1009, it is determined if the color is yellow. If the result of the determination in step S1009 is negative, i.e., if the color is not yellow or the data is abnormal, the process proceeds to step S1010, where a display asking the operator to rear-range the sheet is provided, in order to allow reexecution of the reading operation. If the result of the determination in step S1009 is affirmative, i.e., when color information or data is normal, the process proceeds to step S1011, and then to step S1012, where the magnification in sub-scanning is calculated. Then, in step S1013, the calculated magnification value is set in a scanning-magnification unit for controlling the scanning speed. When the apparatus is adjusted in a factory, by executing this process, storing this value in a memory (not shown), and using the value during scanning in the correction operation, the above-described calculation of the magnification may be replaced by a mere confirming operation. When the scanning magnification is not changed in this process, a reading operation in step S1014 may be omitted in order to reduce the number of scanning operations and shorten the processing time. Then, in step S1015, a correction value for each recorded pixel is obtained, and the value of a yellow-head correction unit stored in the correction-data backup RAM 613 is changed. Then, in the steps S1016 and S1017, correction data for the magenta head 133 is changed. In steps S1018 and S1019, correction data for the cyan head 143 is changed. In steps S1020 and S1021, correction data for the black head 153 is changed. Then, the process proceeds to step S1022, where the printer unit 2 is notified of completion of the change of correction data, and the positions of recording elements used for the correction are stored together with the reader unit 1. Then, in step S1023, completion of the change of nonuniformity correction data is displayed on the operation unit 182, and a copyable or printable state is provided.

Figure 12:
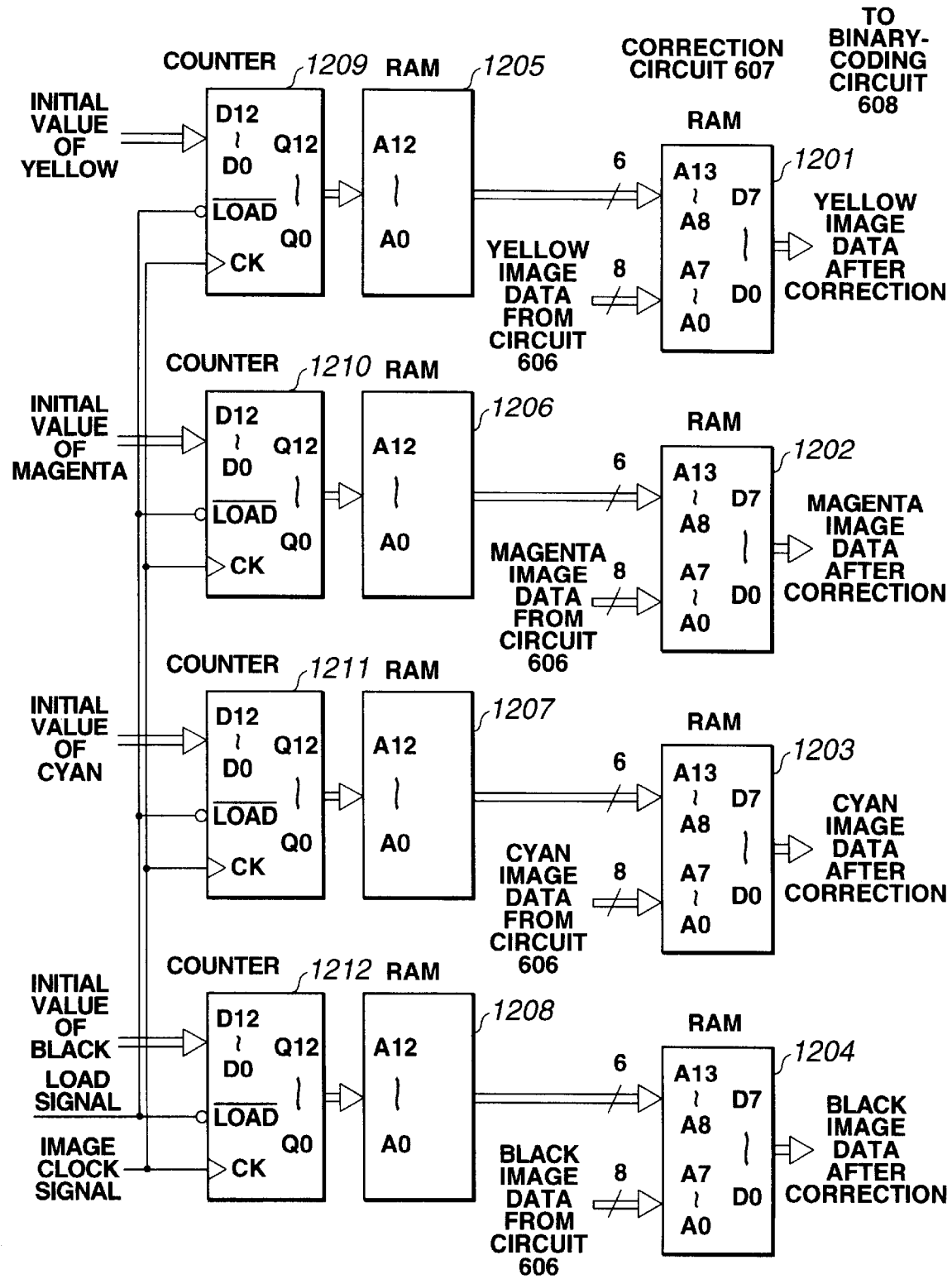
FIG. 12 is a diagram illustrating the detail of a portion including a correction circuit and a backup RAM (random access memory) shown in FIG. 6.
Figure 13:
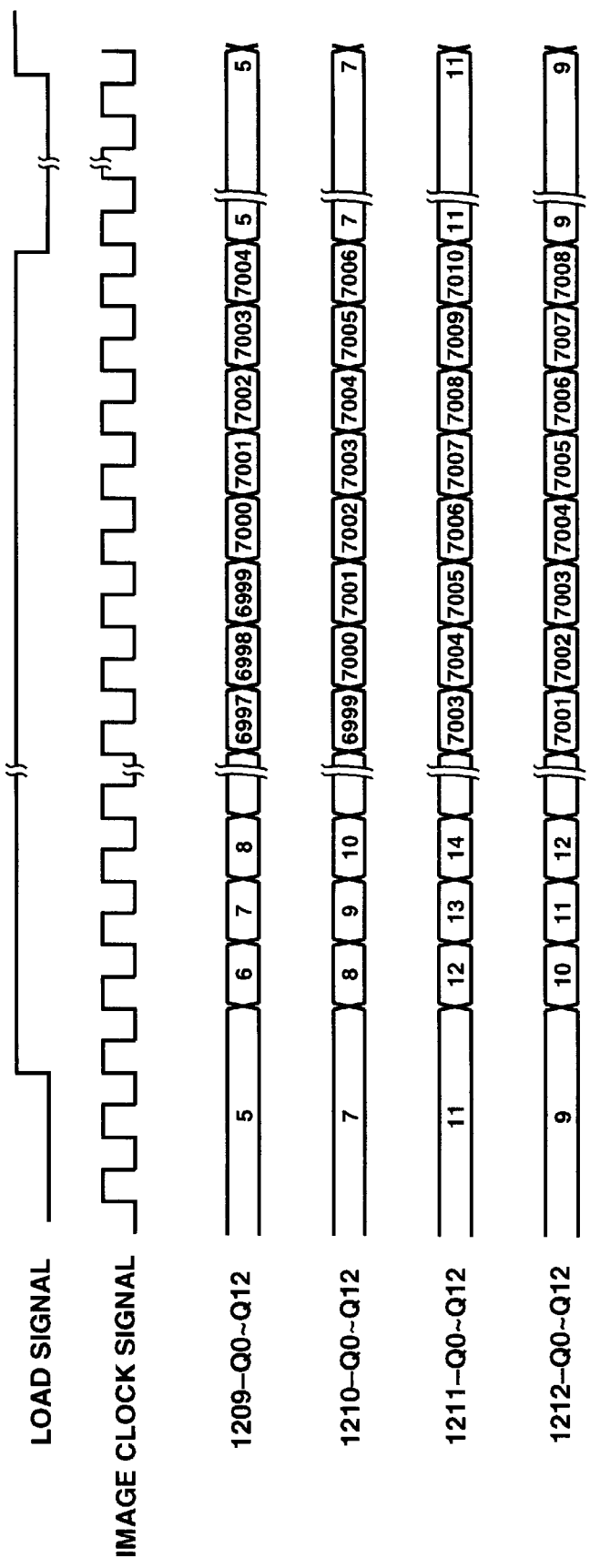
FIG. 13 is a timing chart for the portion including the correction circuit and the backup RAM shown in FIG. 6.

FIGS. 12 and 13 are a block diagram of circuitry for correction processing, and a timing chart for a part of the circuitry, respectively. FIG. 12 corresponds to the correction circuit 607 and the correction-data backup RAM 613 shown in FIG. 6.

In FIG. 12, each of RAMs 1201–1204 holds a plurality of conversion tables for correcting the density of image data in an ordinary copying or printing operation. That is, each of the RAMs 1201–1204 has a plurality of conversion tables corresponding to respective recording characteristics, and selects one of the conversion tables in accordance with correction data output from corresponding one of RAMs 1205–1208 (to be described later) and correct the image data in accordance with the selected conversion table. Although RAMs are used in the second embodiment, ROMs or the like may also be used without causing any problems. These tables are assumed to be held in some portion in the apparatus. Reference numerals 1205–1208 represent correction-data backup RAMs, and reference numerals 1209–1212 represent counter circuits, each for generating the number of the light-emitting element to be driven based on input image data in synchronization with the input image data.

FIG. 13 is a timing chart for the counters 1209–1212. In FIG. 13, the time period from the rise of a load signal to the rise of the next load signal corresponds to the time period for a reading or recording operation for one line by the reader unit 1 or the printer unit 2, respectively. The period "H" of the load signal corresponds to the actual driving time period for the recording head.

As for an image clock signal shown in FIG. 12, one image corresponds to one clock pulse. The image clock signal is not always synchronized with the driving timing for the recording head, but is always synchronized with image data in the reader unit 1. Q0–Q12 in each of the counters 1209–1212 indicate light-emitting elements in the recording head. A value 5 indicates a light-emitting element of the recording head for the fifth pixel. The initial value of each of these counters 1209–1212 is independently assigned, and indicates the number of the leading light-emitting element to be corrected. The initial values are 5, 7, 11 and 9 for the counters 1209, 1210, 1211 and 1212, respectively. Each of these counters is set to the above-described initial value at a timing where the image clock pulse changes from "L" to "H" when the load signal assumes "L", and values 5, 7, 11 and 9 are set to the output terminals Q0–Q12 of the respective counters. When the load signal changes to "H", the counting is started at a timing where the next image clock pulse changes from "L" to "H". Since in the second embodiment, the number of actually driven light-emitting elements in the recording head is 7,000, counting is performed for 7,000 clock pulses. When expressing the value 7,000 by a binary counter, 13 bits are required. Hence, output terminals Q0–Q12 for 13 bits are prepared. Addresses of the nonuniformity-correction-data backup RAMs 1205–1208 are set by these values. The above-described correction values s(k) indicating the light-emitting characteristics of each light-emitting element is stored in each of the RAMs 1205–1208. FIG. 4 illustrates the relationship between the value of each of the RAMs 1205–1208 and the value of corresponding one of the RAMs 1201–1204 for correction. The conversion table shown in FIG. 14 is stored in each of the RAMs 1201–1204.

Figure 14:
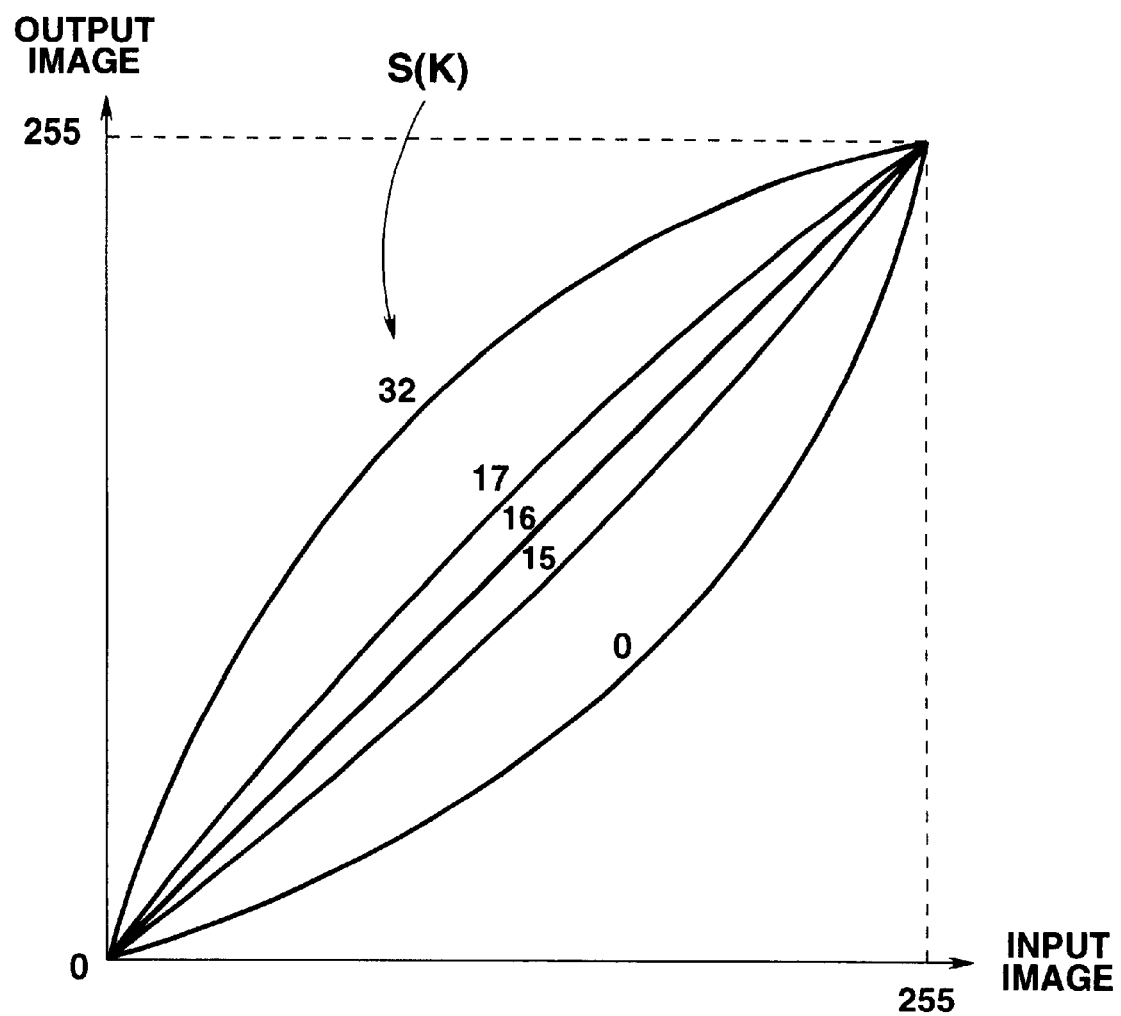
FIG. 14 is a diagram illustrating a correction table stored in the correction circuit shown in FIG. 6.

In FIG. 14, the abscissa represents image data before correction input to A0–A7 of each of the RAMs 1201–1204, and the ordinate represents image data after correction output from D0–D7. The value s(k) is input to A8–A13 of each of the RAMs 1201–1204, and a value between 0–32 is set from each of the RAMs 1205–1208 for each pixel of the recording head. Curves shown in FIG. 14 are set in advance to each of the RAMs 1201–1204. For example, when a value 0 is input to A8–A13 of each of the RAMs 1201–1204, input data is output by being corrected in accordance with the input-output relationship indicated by the lowest curve in FIG. 14. Data input to A8–A13 of each of the RAMs 1201–1204 changes for each pixel. Hence, it is possible to select a density correction table for each pixel, thereby to allow density correction corresponding to the density of the input image, and to prevent nonuniformity in the density caused by the light-emitting characteristic of each light-emitting element.

Third Embodiment

Figure 16:
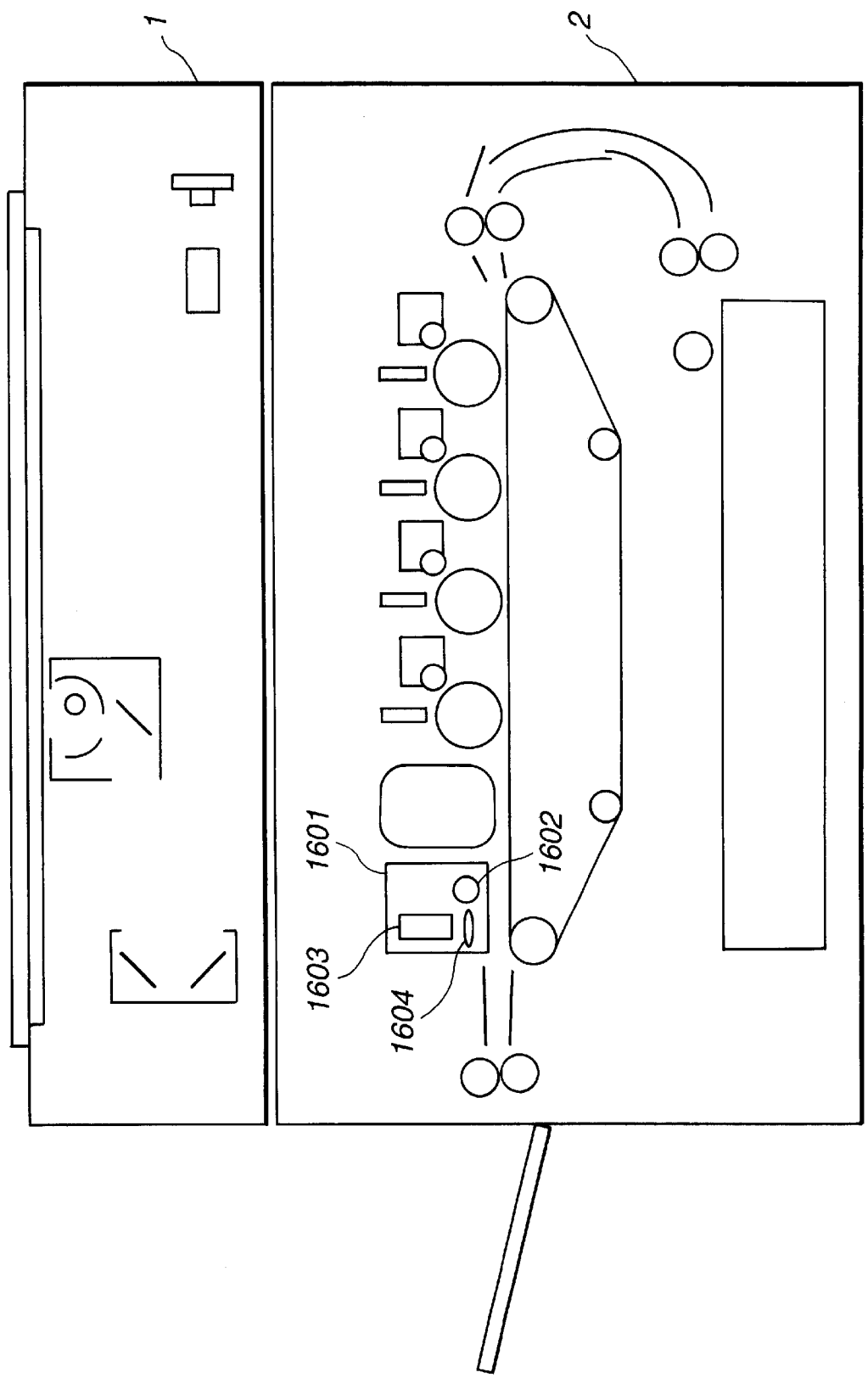
FIG. 16 is a cross-sectional view of an image recording apparatus according to a third embodiment of the present invention.

FIG. 16 is a diagram illustrating a third embodiment of the present invention.

In FIG. 16, a test-pattern reading unit 1601 is provided at a position where it can read a test pattern before the test pattern is discharged.

In contrast to the second embodiment, the third embodiment has features in that an operation of mounting a discharged sheet on an original-mount is omitted, nonuniformity correction can be automatically performed, and correction can also be performed for an image recording apparatus which does not have a copying function (i.e., does not have the reader unit 1).

The test-pattern reading unit 1601 includes a light source 1602, a photoelectric transducer 1603 and a lens 1604, and can move from behind to front of the surface of FIG. 16 on a rail (not shown).

The photoelectric transducer 1603 is not a line sensor, but has a single eye for measuring the amount of light of one point (because in a line sensor, variations are generated in respective elements of the sensor).

A sheet on which a test pattern has been printed is fed to a portion below the test-pattern reading unit 1601 by a conveying belt.

Then, the light source 1602 is lit, and light reflected from the printed test pattern is sensed by the photoelectric transducer 1602 via the lens 1604. In accordance with the movement of the test-pattern reading unit 1601 from behind to front of the plane of FIG. 16, the photoelectric transducer 1602 outputs an image signal corresponding to the amount of sensed light.

Nonuniformity in density can be corrected by performing the calculation shown in the second embodiment for the image signal. In this case, the moving speed of the test-pattern reading unit 1601 is calculated.

According to the above-described configuration, it is possible to automatically perform the entire nonuniformity correction operation.

Fourth Embodiment in the foregoing embodiments, the position of the recording head of the recording unit changes due to distortion of the main body caused, for example, by the movement of the apparatus, or when the recording head is exchanged. Hence, it is necessary to again perform nonuniformity correction. In a fourth embodiment of the present invention, a function of announcement that correction data is again to be formed by displaying on the operation unit or the like when the position of the recording head has been adjusted is provided. When the recording head has been exchanged, it is necessary to also adjust the recording position. Hence, a configuration in which an announcement that correction data is again to be formed may be provided.

Other Embodiments

In the above-described second through fourth embodiments, by changing the scanning speed of the carriage for scanning the recording sheet where the test pattern is recorded, the number of recording elements which have recorded the test pattern is made to coincide with the number of pixels of the read test pattern. However, in an apparatus in which a well-known automatic original-conveying device is used and an original is read and scanned by being moved while fixing the carriage, it is apparent that the moving speed of the original may be changed.

In the above-described embodiments, the ratio of the number of pixels of the light-emitting elements to the number of pixels of the read test pattern is calculated at every operation of reading the test pattern, and an operation of reading the test pattern is again performed if necessary. However, the ratio is not always calculated at every reading operation. That is, the number of recording elements which have recorded the test pattern may be made to coincide with the number of pixels of the read test pattern, by storing the result of the first calculation of the ratio in the calculation control unit 1503, and executing reading control with a reading condition corresponding to the ratio stored in the calculation control unit 1503 at subsequent test pattern reading operations. When the number of recording elements which have recorded the test pattern does not coincide with the number of read pixels even if reading control is executed in accordance with the stored ratio, reading control may, of course, be again executed by calculating the ratio and changing the reading condition.

In the above-described embodiments, after acquiring the light-emitting characteristic of each light-emitting element, image data is corrected in accordance with the acquired characteristic, and each light-emitting element is driven based on the corrected image data. However, the driving current for each light-emitting element may be controlled in accordance with the light-emitting characteristic of the light-emitting element.

In the above-described embodiments, light-emitting elements are used as solid-state recording elements. However, the present invention may, of course, be applied to an image recording apparatus or a copying system which uses various solid-state elements other than the light-emitting elements, such as a thermal print head using heating elements, an ink-jet head or the like.

According to the present invention, an image recording apparatus including a recording head, in which a plurality of solid-stage recording elements are arranged, for performing image recording by causing each of the plurality of solid-state recording elements to record a pixel, and storage means for storing correction data for correcting image data in accordance with a recording characteristic of each of the plurality of solid-state recording elements so as to correspond to the corresponding one of the plurality of solid-state recording elements is provided. Each of the plurality of solid-state recording elements is driven in accordance with input image data and the correction data stored in the storage means. The apparatus also includes pattern-data generation means for generating predetermined pattern data, and for causing each of a predetermined number of consecutive elements to record a pixel, reading means for reading a test pattern recorded by the recording head based on the pattern data generated by the pattern-data generation means, acquisition means for acquiring the recording characteristic of each of the plurality of solid-state recording elements based on a ratio of a number of solid-state recording elements which have recorded pixels in accordance with the predetermined test pattern to a number of pixels of the test pattern read by the reading means, and changing means for changing the correction data for each of the solid-state recording elements in accordance with the recording characteristic of the corresponding one of the solid-state recording elements acquired by the acquisition means. It is thereby possible to accurately acquire the recording characteristics of solid-state recording elements in accordance with the lapse of time, and to prevent nonuniformity in density caused by variations in the recording characteristics.

The individual components shown in outline or designated by blocks in the drawings are all well known in the image recording apparatus and copying system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus comprising:
    at least one recording head, in which a plurality of solid-state recording elements are arranged, for performing image recording by causing each of the plurality of solid-state recording elements to record a pixel;
    storage means for storing correction data for correcting image data in accordance with a recording characteristic of each of the plurality of solid-state recording elements so as to correspond to the corresponding one of the plurality of solid-state recording elements, each of the plurality of solid-state recording elements being driven in accordance with input image data and the correction data stored in said storage means;

pattern-data generation means for generating predetermined pattern data, and for causing each of a predetermined number of consecutive solid-state recording elements from among the plurality of solid-state recording elements to record a pixel based on the predetermined pattern data;

reading means for reading a test pattern recorded by said recording head based on the predetermined pattern data generated by said pattern-data generation means;

acquisition means for acquiring the recording characteristic of each of the plurality of solid-state recording elements based on a ratio of a number of solid-state recording elements which have recorded pixels in accordance with the predetermined pattern data to a number of pixels of the test pattern read by said reading means; and changing means for changing the correction data for each of the solid-state recording elements in accordance with the recording characteristic of the corresponding one of the solid-state recording elements acquired by said acquisition means.

2. An image recording apparatus according to claim 1, further comprising:

second storage means for storing the recording characteristic of each of the plurality of solid-state recording elements acquired by said acquisition means.

3. An image recording apparatus according to claim 1, further comprising:

correction means for correcting the input image data in accordance with the correction data stored in said storage means, wherein each of the plurality of solid-state recording elements is driven based on the image data corrected by said correction means.

4. An image recording apparatus according to claim 3, wherein said correction means includes a plurality of conversion tables, each corresponding to a characteristic of the solid-state recording elements, and corrects the image data using one of the plurality of conversion tables in accordance with the characteristic of each of the plurality of solid-state recording elements stored in said storage means.

5. An image recording apparatus according to claim 1, further comprising:

calculation means for calculating the ratio, wherein said acquisition means acquires the recording characteristic of each of the plurality of solid-state recording elements based on a result of the calculation by said calculation means.

6. An image recording apparatus according to claim 5, wherein the recording characteristic of each of the solid-state recording elements is acquired by changing a magnification of the test pattern read by said reading means in accordance with the ratio calculated by said calculation means.

7. An image recording apparatus according to claim 5, wherein the recording characteristic of each of the plurality of solid-state recording elements is acquired by again reading the test pattern by said reading means after changing a reading condition of said reading means in accordance with the ratio calculated by said calculation means.

8. An image recording apparatus according to claim 7, wherein the reading condition is a scanning speed for the test pattern.

9. An image recording apparatus according to claim 1, wherein said reading means is provided at a position where said reading means can read the test pattern before the test pattern is discharged.

10. An image recording apparatus according to claim 5, further comprising:

third storage means for storing the ratio calculated by said calculation means, wherein said acquisition means acquires the recording characteristic of each of the plurality of solid-state recording elements based on the ratio which is stored by said third storage means.

11. An image recording apparatus according to claim 1, wherein said reading means reads the test pattern by scanning the test pattern.

12. An image recording apparatus according to claim 1, further comprising;

guidance means for guiding an operator about a method for mounting a recording medium having the test pattern recorded thereon, when said reading means reads the test pattern.

13. An image recording apparatus according to claim 1, further comprising:

announcement means for announcing that correction data is again to be formed.

14. An image recording apparatus according to claim 13, wherein said announcement means announces that correction data is again to be formed when the position of said recording head has been adjusted.

15. An image recording apparatus according to claim 13, wherein said announcement means announces that correction data is again to be formed when said recording head has been exchanged.

16. An image recording apparatus according to claim 1, wherein a plurality of recording heads are provided, and wherein each of said plurality of recording heads is driven by image data for recording a different color.

17. An image recording apparatus according to claim 16, wherein said plurality of recording heads record respective test patterns on a same recording medium.

18. An image recording apparatus according to claim 1, wherein the solid-state recording element comprises a light-emitting element.

19. An image recording apparatus according to claim 18, further comprising:

developing means for developing an electrostatic latent image on a photosensitive member recorded by said recording head; and transfer means for transferring a toner image obtained by the development by said developing means onto a recording medium.

20. A method for adjusting an image recording apparatus including at least one recording head, in which a plurality of solid-state recording elements are arranged, for performing image recording by causing each of the plurality of solid-state recording elements to record a pixel, and storage means for storing correction data for correcting image data in accordance with a recording characteristic of each of the plurality of solid-state recording elements so as to correspond to the corresponding one of the plurality of solid-state recording elements, each of the plurality of solid-state recording elements being driven in accordance with input image data and the correction data stored in the storage means, said method comprising:

a pattern-data generation step of generating predetermined pattern data, and causing each of a predetermined number of consecutive solid-state recording elements from among the plurality of solid-state recording elements to record a pixel based on the predetermined pattern data;

a reading step of reading a test pattern recorded by the recording head based on the pattern data generated in said pattern-data generation step;

an acquisition step of acquiring the recording characteristic of each of the plurality of solid-state recording elements based on a ratio of a number of solid-state recording elements which have recorded pixels in accordance with the predetermined test pattern to a number of pixels of the test pattern read in said reading step; and a changing step of changing the correction data for each of the solid-state recording elements in accordance with the recording characteristic of the corresponding one of the solid-state recording elements acquired in said acquisition step.

21. A copying system comprising:

reading means for reading an original and outputting image data;

at least one recording head, in which a plurality of solid-state recording elements are arranged, for performing image recording by causing each of the plurality of solid-state recording elements to record a pixel;

storage means for storing correction data for correcting image data in accordance with a recording characteristic of each of the plurality of solid-state recording elements so as to correspond to the corresponding one of the plurality of solid-state recording elements, each of the plurality of solid-state recording elements being driven in accordance with the image data output from said reading means and the correction data stored in said storage means;

pattern-data generation means for generating predetermined pattern data, and for causing each of a predetermined number of consecutive solid-state recording elements from among the plurality of solid-state recording elements to record a pixel;

acquisition means for causing said reading means to read a test pattern recorded by said recording head based on the pattern data generated by said pattern-data generation means, and for acquiring the recording characteristic of each of the plurality of solid-state recording elements based on a ratio of a number of solid-state recording elements which have recorded pixels in accordance with the pattern data to a number of pixels of the test pattern read by said reading means; and changing means for changing the correction data for each of the solid-state recording elements in accordance with the recording characteristic of the corresponding one of the solid-state recording elements acquired by said acquisition means.

22. An image recording apparatus comprising:

at least one recording head, in which a plurality of solid-state recording elements are arranged, for performing image recording by causing each of the plurality of solid-state recording elements to record a pixel;

pattern-data generation means for generating predetermined pattern data, and for causing each of a predetermined number of consecutive solid-state recording elements from among the plurality of solid-state recording elements to record a pixel based on the predetermined pattern data;

reading means for reading a test pattern recorded by said recording head based on the predetermined pattern data generated by said pattern-data generation means;

acquisition means for acquiring a recording characteristic of each of the plurality of solid-state recording elements based on ratio of a number of solid-state recording elements which have recorded pixels in accordance with the predetermined pattern data to a number of pixels of the test pattern by said reading means;

storage means for storing correction data for correcting image data in accordance with the recording characteristic of each of the plurality of solid-state recording elements acquired by said acquisition means; and driving means for driving each of the plurality of solid-state recording elements in accordance with input image data and the correction data stored in said storage means.

23. An image recording apparatus according to claim 22, further comprising correction means for correcting the input image data in accordance with the correction data stored in said storage means, wherein said driving means drives each of the plurality of solid-state recording elements based on the image data corrected by correction means.

24. An image recording apparatus according to claim 23, wherein said correction means includes a plurality of conversion tables, each corresponding to a recording characteristic of the solid-state recording elements, and corrects the input image data using one of the plurality inversion tables.

25. An image recording apparatus according to claim 22, wherein each said solid-state recording element comprises a light-emitting element.

26. An image recording apparatus according to claim 22, further comprising original reader means for reading an original and outputting image data, wherein said driving means drives each of the plurality of solid-state recording elements in accordance with the image data output by said original reader means and the correction data stored in said storage means.

27. An image recording apparatus according to claim 22, further comprising calculating means for calculating the correction based on a density value of the test pattern and the recording characteristic of each of solid-state recoding elements.

28. An image recording method, comprising the steps of:

performing image recording, using at least one recording head, in which a plurality of solid-state recording elements are arranged, by causing each of the plurality of solid-state recording elements to record a pixel;

generating predetermined pattern data, and causing each of a predetermined number of consecutive solid-state recording elements from among the plurality of solid-state recording elements to record a pixel based on the predetermined pattern data;

reading a test pattern recorded in said recording step, based on the predetermined pattern data generated in said pattern-data generation step;

acquiring a recording characteristic of each of the plurality of solid-state recording elements based on a ratio of a number of solid-state recording elements which have recorded pixels in accordance with the predetermined pattern data to a number of pixels of the test pattern in said reading step;

storing correction data for correcting image data in accordance with the recording characteristic of each of the plurality of solid-state recoding elements acquired in said acquiring step; and driving each of the plurality of solid-state recording elements in accordance with input image data and the correction data stored in said storing step.

29. An image recording method according to claim 28, further comprising the step of correcting the input image data in accordance with the correction data stored in said storing step, wherein said driving step includes driving each of the plurality of solid-state recording elements based on the image data corrected by correction means.

30. An image recording method according to claim 29, wherein said correcting step is performed using a plurality of conversion tables, each corresponding to a recording characteristic of the solid-state recording elements, and corrects the input image data using one of the plurality inversion tables.

31. An image recording method according to claim 28, wherein each solid-state recording element comprises a light-emitting element.

32. An image recording method according to claim 28, further comprising the step of reading an original and outputting image data, wherein said driving step includes driving each of the plurality of solid-state recording elements in accordance with the image data output by original reader means and the correction data stored in said storing step.

33. An image recording method according to claim 28, further comprising the step of calculating the correction data based on density value of the test pattern and the recording characteristic of each of the solid-state recording elements.

* * * * *